US012598038B2

(12) United States Patent
Li et al.

(10) Patent No.: US 12,598,038 B2
(45) Date of Patent: Apr. 7, 2026

(54) METHOD FOR WIRELESS COMMUNICATION, TRANSMITTER, AND RECEIVER

(71) Applicant: GUANGDONG OPPO MOBILE TELECOMMUNICATIONS CORP., LTD., Dongguan (CN)

(72) Inventors: Yapu Li, Dongguan (CN); Chaoming Luo, Dongguan (CN); Ning Gao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/321,580

(22) Filed: Sep. 8, 2025

(65) Prior Publication Data

US 2026/0005807 A1 Jan. 1, 2026

Related U.S. Application Data

(63) Continuation of application No. PCT/CN2023/098872, filed on Jun. 7, 2023.

(51) Int. Cl.
*H04W 84/12* (2009.01)
*H04L 5/00* (2006.01)

(52) U.S. Cl.
CPC ........... *H04L 5/0044* (2013.01); *H04W 84/12* (2013.01)

(58) Field of Classification Search
CPC . H04W 72/0453; H04W 84/12; H04W 28/06; H04W 72/04; H04W 72/21; H04W 72/52; H04W 72/53

(Continued)

(56) References Cited

U.S. PATENT DOCUMENTS

| | | | | |
|---|---|---|---|---|
| 2017/0155486 A1* | 6/2017 | Park | | H04L 5/005 |
| 2017/0339692 A1* | 11/2017 | Chun | | H04L 27/2602 |

(Continued)

FOREIGN PATENT DOCUMENTS

| | | |
|---|---|---|
| CN | 115442894 A | 12/2022 |
| CN | 116134925 A | 5/2023 |

(Continued)

OTHER PUBLICATIONS

WIPO, International Search Report and Written Opinion for International Application No. PCT/CN2023/098872, Jan. 23, 2024. 12 pages (with English translation).

(Continued)

*Primary Examiner* — Joseph Arevalo
(74) *Attorney, Agent, or Firm* — Sheppard, Mullin, Richter & Hampton LLP

(57) ABSTRACT

A method for wireless communication, a transmitter, and a receiver are provided. The method includes the following. A transmitter transmits a first ultra-high reliability (UHR) extended long range (ELR) physical layer protocol data unit (PPDU). The first UHR ELR PPDU at least includes a legacy short training field (L-STF), a legacy long training field (L-LTF), a legacy signal (L-SIG) field, a repeated L-SIG (RL-SIG) field, a universal signal (U-SIG) field, a UHR-STF, a UHR-LTF, a data field, and a packet extension (PE) field, where the data field is transmitted at a granularity of a first frequency-domain resource unit with N times duplication in a bandwidth of the first UHR ELR PPDU, and N equals to 4.

14 Claims, 10 Drawing Sheets

(58) Field of Classification Search
USPC ....... 370/329, 336, 338, 252, 230, 328, 331, 370/312
See application file for complete search history.

(56) References Cited

U.S. PATENT DOCUMENTS

| | | | |
|---|---|---|---|
| 2017/0359837 A1* | 12/2017 | Seok | H04L 27/2613 |
| 2021/0282146 A1* | 9/2021 | Kim | H04W 72/0453 |
| 2021/0307069 A1* | 9/2021 | Xin | H04W 80/02 |
| 2021/0337546 A1* | 10/2021 | Kim | H04L 5/0094 |
| 2021/0360628 A1* | 11/2021 | Kim | H04L 5/0037 |
| 2022/0029772 A1 | 1/2022 | Wu et al. | |
| 2023/0283423 A1* | 9/2023 | Kenney | H04L 1/04 370/329 |
| 2024/0235722 A1* | 7/2024 | Yu | H04L 1/0075 |
| 2024/0244601 A1* | 7/2024 | Kim | H04L 5/0007 |
| 2024/0259149 A1* | 8/2024 | Park | H04W 72/04 |
| 2024/0322961 A1* | 9/2024 | Gao | H04L 5/0044 |
| 2024/0334347 A1* | 10/2024 | Yang | H04W 52/325 |
| 2024/0348365 A1* | 10/2024 | Bansal | H04L 1/0061 |
| 2024/0413931 A1* | 12/2024 | Yu | H04L 1/0041 |
| 2025/0016036 A1* | 1/2025 | Lee | H04L 27/2637 |
| 2025/0016755 A1* | 1/2025 | Zhang | H04W 72/0453 |
| 2025/0071006 A1* | 2/2025 | Yu | H04W 84/12 |
| 2025/0132881 A1* | 4/2025 | Ko | H04W 8/24 |
| 2025/0184195 A1* | 6/2025 | Lim | H04L 27/261 |
| 2025/0202736 A1* | 6/2025 | Ding | H04L 5/0053 |

FOREIGN PATENT DOCUMENTS

| | | | | |
|---|---|---|---|---|
| WO | 2021034155 A1 | 2/2021 | | |
| WO | WO-2021071132 A1 * | 4/2021 | .............. | H04L 1/00 |
| WO | WO-2022169222 A1 * | 8/2022 | .......... | H04L 69/322 |

OTHER PUBLICATIONS

"IEEE P802.11be™/D3.1, Draft Standard for Information technology- Tele-communications and information exchange between systems Local and metropolitan area networks- Specific requirements, Part 11: Wireless LAN Medium Access Control (MAC) and Physical Layer (PHY) Specifications, Amendment 8: Enhancements for extremely high throughput (EHT)", Mar. 2023. 1005 pages.

* cited by examiner

100

110

120    120

| 8 μs | 8 μs | 4 μs | |
|---|---|---|---|
| L-STF | L-LTF | L-SIG | DATA |

| SERVICE (16 BITS) | PSDU | TAIL BITS | PAD BITS |
|---|---|---|---|

| SCRAMBLER INITIALIZATION B0-B6 (ALL SET TO 0) | RESERVED SERVICE BITS B7-B15 (RERSERVED) |
|---|---|

200

RU
ALLOCATION:

| TRIGGER TYPE | UL LENGTH | MORE TF | CS REQUIRED | UL BW | GI AND HE/EHT/UHR-LTF TYPE/TRIGGER TXOP SHARING MODE | DUPLICATION TRANSMISSION MODE | NUMBER OF HE/EHT/UHR-LTF SYMBOLS | RESERVED |
|---|---|---|---|---|---|---|---|---|
| 4 | 12 | 1 | 1 | 2 | 2 | 1 | 3 | 1 |

NUMBER OF BITS:

| LDPC EXTRA SYMBOL SEGMENT | AP TX POWER | PRE-FEC PADDING FACTOR | PE DISAMBIGUITY | UL SPATIAL REUSE | RESERVED | HE/EHT/ UHR P160 | SPECIAL USER INFO FIELD FLAG | UHR RESERVED | RESERVED |
|---|---|---|---|---|---|---|---|---|---|
| 1 | 6 | 2 | 1 | 16 | 1 | 1 | 1 | 7 | 1 |

NUMBER OF BITS:

FIG. 14

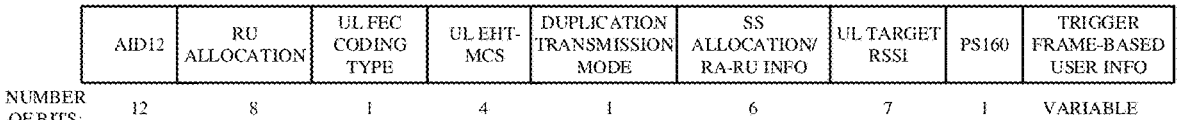

| | AID12 | RU ALLOCATION | UL FEC CODING TYPE | UL EHT-MCS | DUPLICATION TRANSMISSION MODE | SS ALLOCATION/ RA-RU INFO | UL TARGET RSSI | PS160 | TRIGGER FRAME-BASED USER INFO |
|---|---|---|---|---|---|---|---|---|---|
| NUMBER OF BITS: | 12 | 8 | 1 | 4 | 1 | 6 | 7 | 1 | VARIABLE |

FIG. 15

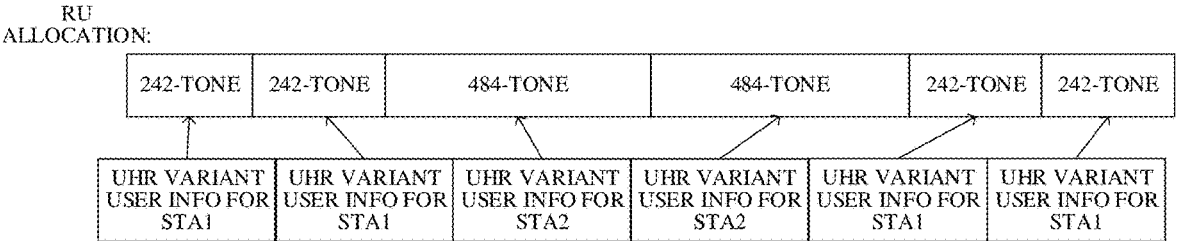

RU ALLOCATION:

| 242-TONE | 242-TONE | 484-TONE | 484-TONE | 242-TONE | 242-TONE |
|---|---|---|---|---|---|
| UHR VARIANT USER INFO FOR STA1 | UHR VARIANT USER INFO FOR STA1 | UHR VARIANT USER INFO FOR STA2 | UHR VARIANT USER INFO FOR STA2 | UHR VARIANT USER INFO FOR STA1 | UHR VARIANT USER INFO FOR STA1 |

FIG. 16

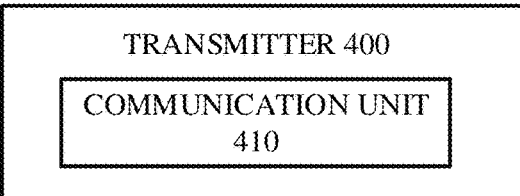

TRANSMITTER 400

COMMUNICATION UNIT
410

FIG. 17

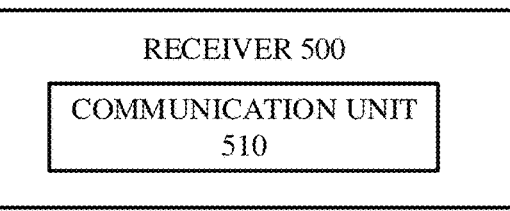

RECEIVER 500

COMMUNICATION UNIT
510

FIG. 18

METHOD FOR WIRELESS COMMUNICATION, TRANSMITTER, AND RECEIVER

CROSS-REFERENCE TO RELATED APPLICATION(S)

This application is a continuation of International Application No. PCT/CN2023/098872, filed Jun. 7, 2023, the entire disclosure of which is hereby incorporated by reference.

TECHNICAL FIELD

Embodiments of the disclosure relates to the field of communication, and in particular, to a method for wireless communication, a transmitter, and a receiver.

BACKGROUND

Low-latency and high-reliability transmission is the focus of next-generation wireless fidelity (Wi-Fi). During transmission of a low-latency service, when an access point (AP) detects that all channels are available, the AP transmits a physical layer protocol data unit (PPDU). However, at a station (STA) side, short-term or random interference may occur in a certain 20 MHz subchannel (but is unable to be detected at an AP side). As a result, the STA is unable to correctly decode data and thus is unable to reply with an acknowledgement (ACK), leading to multiple retransmissions by the AP and a relatively long latency.

SUMMARY

A method for wireless communication, a transmitter, and a receiver are provided in the disclosure.

In a first aspect, a method for wireless communication is provided. The method includes the following. A transmitter transmits a first ultra-high reliability (UHR) extended long range (ELR) physical layer protocol data unit (PPDU). The first UHR ELR PPDU at least includes a legacy short training field (L-STF), a legacy long training field (L-LTF), a legacy signal (L-SIG) field, a repeated L-SIG (RL-SIG) field, a universal signal (U-SIG) field, a UHR-STF, a UHR-LTF, a data field, and a packet extension (PE) field, where the data field is transmitted at a granularity of a first frequency-domain resource unit with N times duplication in a bandwidth of the first UHR ELR PPDU, and N equals to 4.

In a second aspect, a transmitter is provided. The transmitter includes a transceiver, a processor coupled to the transceiver, and a memory storing a computer program which, when executed by the processor, causes the transmitter to transmit a first UHR ELR PPDU. The first UHR ELR PPDU at least includes an L-STF, an L-LTF, an L-SIG field, an RL-SIG field, a U-SIG field, a UHR-STF, a UHR-LTF, a data field, and a PE field, where the data field is transmitted at a granularity of a first frequency-domain resource unit with N times duplication in a bandwidth of the first UHR ELR PPDU, and N equals to 4.

In a third aspect, a receiver is provided. The receiver includes a transceiver, a processor coupled to the transceiver, and a memory storing a computer program which, when executed by the processor, causes the receiver to receive a first UHR ELR PPDU transmitted by a transmitter. The first UHR ELR PPDU at least includes an L-STF, an L-LTF, an L-SIG field, an RL-SIG field, a U-SIG field, a UHR-STF, a UHR-LTF, a data field, and a PE field, where the data field is transmitted at a granularity of a first frequency-domain resource unit with N times duplication in a bandwidth of the first UHR ELR PPDU, and N equals to 4.

Other features and aspects of the disclosed features will become apparent from the following detailed description, taken in conjunction with the accompanying drawings, which illustrate, by way of example, the features in accordance with embodiments of the present disclosure. The summary is not intended to limit the scope of any embodiment described herein.

BRIEF DESCRIPTION OF THE DRAWINGS

The present disclosure is best understood from the following detailed description when read in conjunction with the accompanying drawings.

FIG. 14 is a schematic format diagram of a common information (info) field carrying a duplication transmission mode field provided in embodiments of the disclosure.

FIG. 15 is a schematic format diagram of a UHR variant user info field carrying a duplication transmission mode field provided in embodiments of the disclosure.

FIG. 16 is a schematic diagram illustrating allocation of MRUs for duplication transmission by an AP to multiple STAs provided in embodiments of the disclosure.

FIG. 17 is a schematic block diagram of a transmitter provided in embodiments of the disclosure.

FIG. 18 is a schematic block diagram of a receiver provided in embodiments of the disclosure.

DETAILED DESCRIPTION

The following will describe technical solutions of embodiments of the disclosure with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The technical solutions of the embodiments of the disclosure may be applied to various communication systems, for example, wireless local area networks (WLAN), wireless fidelity (Wi-Fi), or other communication systems.

Figure 1:
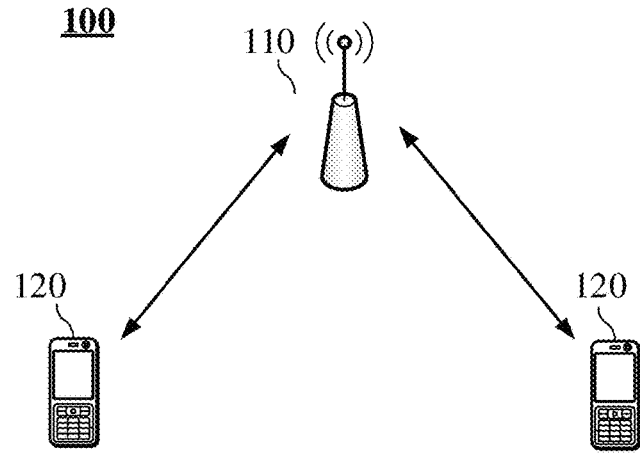
FIG. 1 is a schematic architectural diagram of a communication system provided in embodiments of the disclosure.

Exemplarily, FIG. 1 illustrates a communication system 100 to which embodiments of the disclosure are applied. The communication system 100 may include an access point (AP) 110 and a station (STA) 120 accessing a network via the AP 110.

In some scenarios, the AP may be referred to as an AP STA, that is, the AP is also a type of STA in some sense.

In some scenarios, the STA may be referred to as a non-AP STA.

Communication in the communication system 100 may be communication between the AP and the non-AP STA, communication between the non-AP STAs, or communication between the STA and a peer STA. The peer STA may refer to a device that is in peer-to-peer communication with the STA. For example, the peer STA may be an AP or a non-AP STA.

The AP may be a bridge for connecting a wired network and a wireless network. The AP is mainly used for connecting various wireless network clients together and then connecting the wireless network to an Ethernet. The AP may be a terminal device (for example, a mobile phone) having a Wi-Fi chip or a network device (for example, a router).

It may be understood that, a role of the STA in the communication system is not absolute. For example, in some scenarios, when a mobile phone is connected to a router, the mobile phone is a non-AP STA. When the mobile phone is a hotspot for another mobile phone, the mobile phone serves as an AP.

The AP and the non-AP STA may be devices applied to vehicle to everything (V2X); internet of things (IoT) nodes, sensors, etc. in IoT; smart cameras, smart remote controls, smart water meters and electricity meters, etc. in smart home; sensors in smart city, etc.

In some embodiments, the non-AP STA may support various current and future 802.11 WLAN standards, such as 802.11be, 802.11ax, 802.11ac, 802.11n, 802.11g, 802.11b, 802.11a, etc.

In some embodiments, the AP may be a device that supports various current and future 802.11 WLAN standards, such as 802.11be, 802.11ax, 802.11ac, 802.11n, 802.11g, 802.11b, 802.11a, etc.

In embodiments of the disclosure, the STA may be a device supporting WLAN/Wi-Fi technology, such as a mobile phone, a tablet (pad), a computer, a virtual reality (VR) device, an augmented reality (AR) device, a wireless device in industrial control, a set-top box, a wireless device in self-driving, an in-vehicle communication device, a wireless device in remote medicine, a wireless device in smart grid, a wireless device in transportation safety, a wireless device in smart city or a wireless device in smart home, or a wireless communication chip/an application specific integrated circuit (ASIC)/a system-on-chip (SOC), etc.

A frequency band supported by WLAN technology may include, but is not limited to, a low frequency band (for example, 2.4 Giga Hertz (GHz), 5 GHZ, and 6 GHz), and a high frequency band (for example, 60 GHz).

FIG. 1 exemplarily illustrates one AP STA and two non-AP STAs. Optionally, the communication system 100 may include multiple AP STAs and other quantities of non-AP STAs, which is not limited in embodiments of the disclosure.

It may be understood that in embodiments of the disclosure, a device with communication functions in a network/system may be referred to as a "communication device". Taking the communication system 100 illustrated in FIG. 1 as an example, the communication device may include the AP 110 and the STA(s) 120 that have communication functions. The AP 110 and the STA(s) 120 may be the devices described above and will not be repeated herein. The communication device may further include other devices such as a network controller, a gateway, or other network entities in the communication system 100, which is not limited in embodiments of the disclosure.

It may be understood that, the terms "system" and "network" herein are usually used interchangeably throughout this disclosure. The term "and/or" herein only describes an association between associated objects, which means that there can be three relationships. For example, A and/or B can mean A alone, both A and B exist, and B alone. In addition, the character "/" herein generally indicates that the associated objects are in an "or" relationship.

It may be understood that, "indication" referred to in embodiments of the disclosure may be a direct indication, may be an indirect indication, or may mean that there is an association. For example, A indicates B may mean that A directly indicates B, for instance, B can be obtained according to A; may mean that A indirectly indicates B, for instance, A indicates C, and B can be obtained according to C; or may mean that that there is an association between A and B.

In the elaboration of embodiments of the disclosure, the term "correspondence" may mean that there is a direct or indirect correspondence between the two, or may mean that there is an association between the two, or may mean a relationship of indicating and being indicated or configuring and being configured, etc.

In embodiments of the disclosure, the "pre-defined" can be implemented by pre-storing a corresponding code(s) or a corresponding table(s) in a device (for example, including the AP and the STA) or in other manners that can be used for indicating related information, and the disclosure is not limited in this regard. For example, the "pre-defined" may mean defined in a protocol.

To facilitate understanding of technical solutions of embodiments of the disclosure, related terms in the disclosure will be described below.

Association identifier (AID), which is used to identify a terminal associated with an AP.

Medium access control (MAC), which is an abbreviation for an MAC address.

Transmission opportunity (TXOP), which refers to a period of time in which a terminal having the TXOP may initiate one or more transmissions.

To facilitate understanding of technical solutions of embodiments of the disclosure, non-high throughput (non-HT) duplicate physical layer protocol data unit (PPDU) transmission related to the disclosure will be described.

Figure 2:
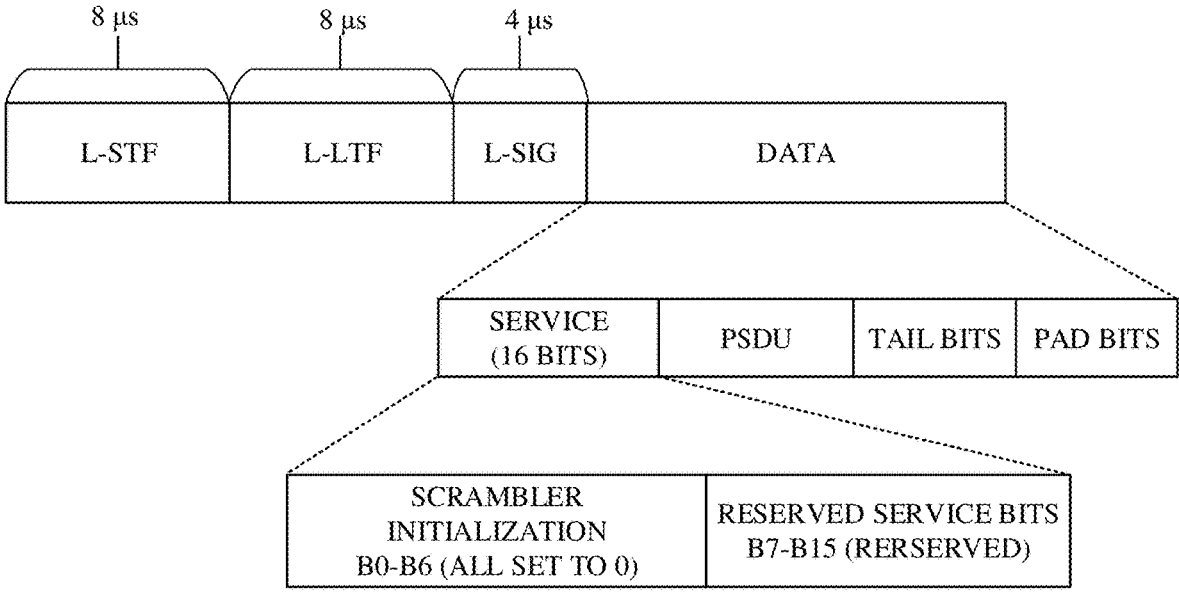
FIG. 2 is a schematic structural diagram of a non-high throughput (non-HT) physical layer protocol data unit (PPDU).

The non-HT duplicate PPDU transmission refers to duplication of a non-HT PPDU per 20 megahertz (MHz). As illustrated in FIG. 2, the non-HT PPDU only contains a legacy short training field (L-STF), a legacy long training field (L-LTF), a legacy signal (L-SIG) field, and a data field. Non-HT duplicate transmission is used to transmit to non- HT STAs, HT STAs, very high throughput (VHT) STAs, high-efficiency (HE) STAs, and extremely high throughput (EHT) STAs that may be present in a part of a 40 MHz, 80 MHz, 160 MHz, or 320 MHz channel. Some control frames, for example, request-to-send (RTS), clear-to-send (CTS), or null data PPDU announcement (NDPA), are transmitted in the form of the non-HT duplicate transmission.

To facilitate understanding of technical solutions of embodiments of the disclosure, EHT duplicate (EHT DUP) transmission related to the disclosure will be described.

The EHT DUP transmission refers to duplication of transmitted data in a payload portion of an EHT PPDU in the frequency domain, which is proposed to solve the limitations of a 6 GHz power spectral density (PSD) and has the following features:

- an EHT DUP mode is an optional mode in IEEE 802.11 be and is applicable only in the 6 GHz frequency band;
- an EHT DUP mode is applicable only for an EHT single user (SU) transmission;
- an EHT DUP mode can only be used with bandwidth 80/160/320 MHz and without preamble puncturing;
- an EHT DUP mode is applicable only in conjunction with binary phase shift keying (BPSK) dual carrier modulation (DCM) (BPSK-DCM) modulation, rate-1/2 (i.e., EHT-modulation and coding scheme (MCS) 14) low density parity check code (LDPC) coding, and only one spatial stream.

For example, for DUP transmission of an 80 MHz EHT PPDU, an STA duplicates data from the lower 40 MHz to the higher 40 MHz, and BPSK-DCM modulation is used for data in the lower 40 MHz.

DCM refers to modulation of the same information on a pair of subcarriers. DCM is a modulation scheme for EHT-SIG and data fields, which is applied for EHT-MCS 14 and EHT-MCS 15. DCM is applicable only to BPSK, rate-1/2 coding, and single spatial stream non-multi-user (non-MU) multiple-input multiple-output (MIMO) transmission.

Preamble puncturing refers to the transmission of a PPDU in which no signal is present in at least one of the 20 MHz subchannels within the PPDU bandwidth. In the case where an AP or an STA detects through clear channel assessment (CCA) that a 20 MHz subchannel is busy, the AP or the STA can puncture the 20 MHz subchannel.

Low-latency and high-reliability transmission is the focus of next-generation Wi-Fi. During transmission of a low-latency service, when an AP detects that all channels are available, the AP transmits a PPDU. However, at an STA side, short-term or random interference may occur in a certain 20 MHz subchannel (but is unable to be detected at an AP side). As a result, the STA is unable to correctly decode data and thus is unable to reply with an acknowledgement (ACK), leading to multiple retransmissions by the AP and a relatively long latency.

To solve the above problems, the reliability of transmission is improved through duplication of data in the frequency domain.

However, the non-HT duplicate PPDU transmission is intended for compatibility with legacy STA transmission and reception of some control frames, such as a CTS frame and an RTS frame. Due to its limited preamble field, a non-HT PPDU format is less efficient than an HE/EHT/ultra-high reliability (UHR) PPDU. For example, a non-HT PPDU does not support high-order modulation such as 1024-quadrature amplitude modulation (QAM) and 4096-QAM, and does not support orthogonal frequency division multiple access (OFDMA) transmission. In the same bandwidth, the number of data subcarriers available for the non-HT PPDU is ¼ of the number of data subcarriers available for the HE/EHT/UHR PPDU.

The EHT DUP transmission has a relatively limited application scenario, which can operate only in the 6 GHz frequency band without any punctured channel and uses low-order BPSK modulation. DCM only allows duplication once, and is applicable only to low-order BPSK modulation and single spatial stream non-MU-MIMO transmission.

Based on the above duplication transmission modes, in the case where a transmitter detects that interference occurs in a certain 20 MHz subchannel, the transmitter does not use the 20 MHz subchannel through preamble puncturing. However, in some cases, the transmitter may not be able to detect an interference channel at a receiver, and thus, a channel used by the transmitter for data may be the interference channel for the receiver, resulting in failure of data transmission.

Therefore, how to design a PPDU format to ensure reliable and efficient transmission of a service is an urgent problem to be solved.

To facilitate understanding of technical solutions of embodiments of the disclosure, the technical solutions of embodiments of the disclosure will be elaborated below. The related art below, as an optional scheme, can be arbitrarily combined with the technical solutions of embodiments of the disclosure, which shall all belong to the protection scope of embodiments of the disclosure. Embodiments of the disclosure include at least part of the following contents.

Figure 3:
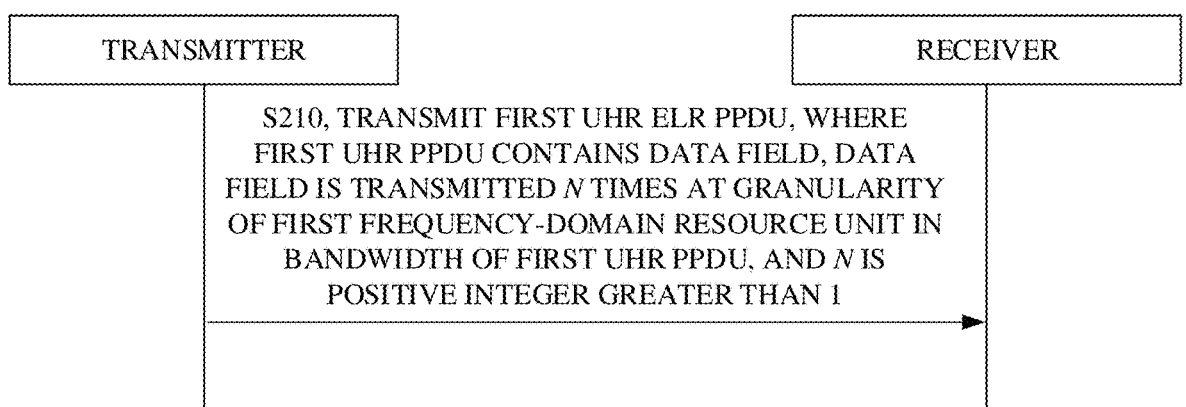
FIG. 3 is a schematic interaction diagram of a method for wireless communication provided in embodiments of the disclosure.

FIG. 3 is a schematic interaction diagram of a method 200 for wireless communication according to embodiments of the disclosure. As illustrated in FIG. 3, the method 200 includes the following.

S210, a transmitter transmits a first UHR extended long range (ELR) PPDU.

Correspondingly, a receiver receives the first UHR ELR PPDU.

The first UHR ELR PPDU contains a data field(s), the data field(s) is transmitted N times over/at/in a granularity of a first frequency-domain resource unit in a bandwidth of the first UHR ELR PPDU, and N is a positive integer greater than 1.

That is, the data field(s) in the first UHR ELR PPDU is transmitted multiple times. In other words, the data field(s) in the first UHR ELR PPDU is transmitted in a duplication transmission mode. In other words, the first UHR ELR PPDU is a UHR duplication PPDU.

In some embodiments, a size of the first frequency-domain resource unit may be considered as a granularity of duplication transmission of the data field, which may also be referred to as a unit of duplication transmission of the data field.

In some embodiments, the number N of transmissions of the data field may also be referred to as the number of duplication transmissions of the data field. In some other embodiments, it may be considered that, the first transmission of the data field is an initial transmission, and a transmission(s) after the first transmission is a duplication transmission(s). In this case, the number of duplication transmissions of the data field is N−1.

It may be noted that in the following embodiments, as an example, the number of duplication transmissions is the total number N of transmissions, but the disclosure is not limited in this regard. The number of duplication transmissions may also be replaced by N−1.

In some embodiments, the transmitter is an AP or an STA. Correspondingly, the receiver may be an STA or an AP.

That is, the first UHR ELR PPDU may be a downlink UHR PPDU or an uplink UHR PPDU.

In some embodiments, the first UHR ELR PPDU may be an SU UHR PPDU, a UHR MU PPDU, or a UHR trigger based (TB) PPDU. The UHR MU PPDU may be used for data transmission to one or more users, that is, a receiver of the UHR MU PPDU may be one or more users. The UHR TB PPDU is transmitted in response to a trigger frame.

Figure 4:
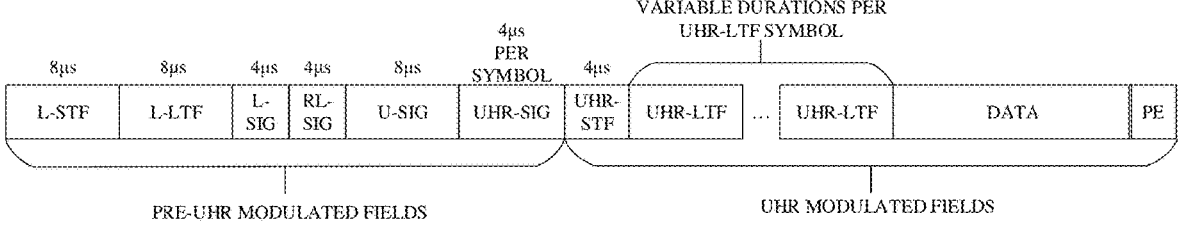
FIG. 4 is a schematic format diagram of an ultra-high reliability (UHR) multi-user (MU) PPDU provided in embodiments of the disclosure.

FIG. 4 is a schematic format diagram of a UHR MU PPDU provided in embodiments of the disclosure. As illustrated in FIG. 4, the UHR MU PPDU may contain the following fields: an L-STF, an L-LTF, an L-SIG field, a repeated L-SIG (RL-SIG) field, a universal signal (U-SIG) field, a UHR signal (UHR-SIG) field, a UHR short training field (UHR-STF), a UHR long training field (UHR-LTF), a data field, and a packet extension (PE) field.

The L-STF, L-LTF, L-SIG, RL-SIG, U-SIG, and UHR-SIG fields may be referred to as pre-UHR modulated fields, and the UHR-STF, UHR-LTF, data, and PE fields may be referred to as UHR modulated fields.

Figure 5:
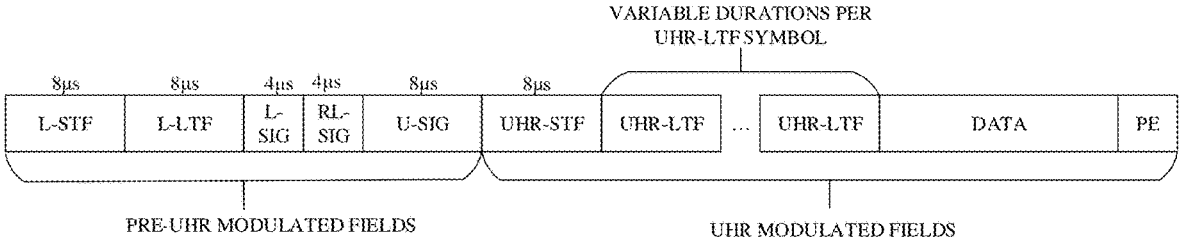
FIG. 5 is a schematic format diagram of a UHR trigger based (TB) PPDU provided in embodiments of the disclosure.

FIG. 5 is a schematic format diagram of a UHR TB PPDU provided in embodiments of the disclosure. As illustrated in FIG. 5, the UHR TB PPDU may contain the following fields: L-STF, L-LTF, L-SIG, RL-SIG, U-SIG, UHR-STF, UHR-LTF, data, and PE.

The L-STF, L-LTF, L-SIG, RL-SIG, and U-SIG fields may be referred to as pre-UHR modulated fields, and the UHR-STF, UHR-LTF, data, and PE fields may be referred to as UHR modulated fields.

In some embodiments, the duration of the UHR-STF in the UHR TB PPDU is twice the duration of the UHR-STF in the UHR MU PPDU.

In some embodiments, for the first UHR ELR PPDU, each UHR-LTF symbol has the same guard interval (GI) duration as each data symbol, which may be, for example, 0.8 µs, 1.6 µs, or 3.2 µs.

In some embodiments, the UHR-LTF includes three types: 1×UHR-LTF, 2×UHR-LTF, and 4×UHR-LTF. The duration of each 1×UHR-LTF, 2×UHR-LTF, or 4×UHR-LTF symbol without GI may be 3.2 µs, 6.4 µs, or 12.8 µs. Each data symbol without GI is 12.8 µs.

In some embodiments, one or more of N−1 duplication transmissions of the data field have a phase rotation relative to the first transmission of the data field.

For example, one or more duplication transmissions of the data field are obtained by applying a certain phase rotation to the first transmission of the data field, which is conducive to reducing a peak to average power ratio (PAPR) of data transmission.

It may be noted that, a unit of the first frequency-domain resource unit is not limited in embodiments of the disclosure. For example, the first frequency-domain resource unit may be a channel or a subchannel, or may be a resource unit (RU) or a multiple resource unit (MRU).

As an example, the specific implementation of the UHR duplication PPDU will be described below in combination with embodiment 1 in which the first frequency-domain resource unit is a subchannel and embodiment 2 in which the first frequency-domain resource unit is an RU/MRU.

Embodiment 1: the first frequency-domain resource unit is a subchannel.

That is, the transmitter can perform duplication transmission of a UHR PPDU at a granularity of the subchannel, thereby improving the reliability of transmission of the UHR PPDU, and reducing a transmission latency caused by data retransmission.

In some embodiments, the transmitter can divide the bandwidth of the first UHR ELR PPDU into N subchannels, encode the data field in the first subchannel, and then duplicate the data field to the other N−1 subchannels. For example, during duplication of the data field to the other N−1 subchannels, a certain phase rotation may be applied. That is, data fields in the other N−1 subchannels may have a certain phase rotation relative to the data field in the first subchannel.

In some embodiments, a bandwidth of the first frequency-domain resource unit is pre-defined. For example, the bandwidth of the first frequency-domain resource unit is a fixed bandwidth, e.g., fixed to 20 MHz, 40 MHz, and the like.

In some other embodiments, a bandwidth of the first frequency-domain resource unit is determined by the transmitter. For example, the transmitter can determine a granularity of duplication transmission and indicate the granularity of duplication transmission to the receiver. For example, the transmitter can indicate the granularity of duplication transmission in the first UHR ELR PPDU.

In some other embodiments, a bandwidth of the first frequency-domain resource unit is determined by the receiver. For example, the receiver can indicate a granularity of duplication transmission to the transmitter, and further, the transmitter can perform duplication transmission of the data field based on the granularity of duplication transmission. In a specific embodiment, for a UHR TB PPDU, an AP can configure for an STA a granularity of duplication transmission via a trigger frame, and further, the STA can perform duplication transmission of a data field based on the granularity of duplication transmission.

That is to say, the transmitter and the receiver have a consistent understanding on the bandwidth of the first frequency-domain resource unit. As such, the transmitter can perform duplication transmission of a data field based on a granularity of duplication transmission, and correspondingly, the receiver can receive based on the granularity of duplication transmission the data field that is subject to duplication transmission.

In some embodiments, the bandwidth of the first frequency-domain resource unit is related to the bandwidth of the first UHR ELR PPDU. For example, the bandwidth of the first frequency-domain resource unit is determined based on the bandwidth of the first UHR ELR PPDU.

For example, when the bandwidth of the first UHR ELR PPDU is 40 MHZ, 80 MHZ, or 160 MHz, the bandwidth of the first frequency-domain resource unit may be 20 MHz.

For another example, when the bandwidth of the first UHR ELR PPDU is 320 MHZ, 480 MHz, or 640 MHz, the bandwidth of the first frequency-domain resource unit may be 40 MHz or 80 MHz.

In some embodiments, the number N of duplication transmissions of the data field in the first UHR ELR PPDU is pre-defined. For example, N is a fixed value, e.g., fixed to 2, 4, or 8.

In some other embodiments, the number N of duplication transmissions of the data field in the first UHR ELR PPDU is determined by the transmitter. For example, the transmitter can determine the number N of duplication transmissions and indicate the number N of duplication transmissions to the receiver. For example, the transmitter can indicate the number N of duplication transmissions in the first UHR ELR PPDU.

In some other embodiments, the number N of duplication transmissions of the data field in the first UHR ELR PPDU is determined by the receiver. For example, the receiver can indicate the number N of duplication transmissions to the transmitter, and further, the transmitter can perform duplication transmission of the data field based on the number N of duplication transmissions. In a specific embodiment, for a UHR TB PPDU, an AP can configure for an STA the number N of duplication transmissions via a trigger frame, and further, the STA can perform duplication transmission of a data field based on the number N of duplication transmissions.

That is to say, the transmitter and the receiver have a consistent understanding on the number N of duplication transmissions. As such, the transmitter can perform duplication transmission of a data field based on the number N of duplication transmissions, and correspondingly, the receiver can receive based on the number N of duplication transmissions the data field that is subject to duplication transmission.

In some embodiments, the number N of duplication transmissions of the data field in the first UHR ELR PPDU is related to the bandwidth of the first UHR ELR PPDU. For example, the number N of duplication transmissions is determined based on the bandwidth of the first UHR ELR PPDU.

For example, when the bandwidth of the first UHR ELR PPDU is 40 MHZ, 80 MHZ, or 160 MHz, the number of duplication transmissions of the data field in the first UHR ELR PPDU is 2, 4, or 8.

For another example, when the bandwidth of the first UHR ELR PPDU is 320 MHZ, 480 MHz, or 640 MHz, the number of duplication transmissions of the data field in the first UHR ELR PPDU is 8, 12, or 16.

As a specific example, the granularity B of duplication transmission and the number N of duplication transmissions that are flexibly configured based on the bandwidth of the first UHR ELR PPDU may be illustrated in Table 1.

TABLE 1

| Bandwidth of first UHR ELR PPDU | N = 2 | N = 4 | N = 8 |
| | Granularity B of duplication transmission (i.e., bandwidth of first frequency-domain resource unit) | | |
| --- | --- | --- | --- |
| 40 MHz | 20 MHz | \ | \ |
| 80 MHz | 40 MHz | 20 MHz | \ |
| 160 MHz | 80 MHz | 40 MHz | 20 MHz |
| 320 MHz | 160 MHz | 80 MHz | 40 MHz |
| 480 MHz | 240 MHz | 120 MHz | 60 MHz |
| 640 MHz | 320 MHz | 160 MHz | 80 MHz |

As can be seen from Table 1, when the bandwidth of the first UHR ELR PPDU is 40 MHz, the granularity of duplication transmission of the data field in the first UHR ELR PPDU may be 20 MHz, and the number N of duplication transmissions of the data field in the first UHR ELR PPDU may be 2.

When the bandwidth of the first UHR ELR PPDU is 80 MHZ, the granularity of duplication transmission of the data field in the first UHR ELR PPDU may be 20 MHz, and the number N of duplication transmissions of the data field in the first UHR ELR PPDU may be 4; or, the granularity of duplication transmission of the data field in the first UHR ELR PPDU may be 40 MHz, and the number N of duplication transmissions of the data field in the first UHR ELR PPDU may be 2.

When the bandwidth of the first UHR ELR PPDU is 160 MHz, the granularity of duplication transmission of the data field in the first UHR ELR PPDU may be 80 MHz, and the number N of duplication transmissions of the data field in the first UHR ELR PPDU may be 2; the granularity of duplication transmission of the data field in the first UHR ELR PPDU may be 40 MHz, and the number N of duplication transmissions of the data field in the first UHR ELR PPDU may be 4; or, the granularity of duplication transmission of the data field in the first UHR ELR PPDU may be 20 MHz, and the number N of duplication transmissions of the data field in the first UHR ELR PPDU may be 8.

When the bandwidth of the first UHR ELR PPDU is 320 MHZ, the granularity of duplication transmission of the data field in the first UHR ELR PPDU may be 160 MHZ, and the number N of duplication transmissions of the data field in the first UHR ELR PPDU may be 2; the granularity of duplication transmission of the data field in the first UHR ELR PPDU may be 80 MHz, and the number N of duplication transmissions of the data field in the first UHR ELR PPDU may be 4; or, the granularity of duplication transmission of the data field in the first UHR ELR PPDU may be 40 MHZ, and the number N of duplication transmissions of the data field in the first UHR ELR PPDU may be 8.

When the bandwidth of the first UHR ELR PPDU is 480 MHZ, the granularity of duplication transmission of the data field in the first UHR ELR PPDU may be 240 MHZ, and the number N of duplication transmissions of the data field in the first UHR ELR PPDU may be 2; the granularity of duplication transmission of the data field in the first UHR ELR PPDU may be 120 MHZ, and the number N of duplication transmissions of the data field in the first UHR ELR PPDU may be 4; or, the granularity of duplication transmission of the data field in the first UHR ELR PPDU may be 60 MHZ, and the number N of duplication transmissions of the data field in the first UHR ELR PPDU may be 8.

When the bandwidth of the first UHR ELR PPDU is 640 MHz, the granularity of duplication transmission of the data field in the first UHR ELR PPDU may be 320 MHZ, and the number N of duplication transmissions of the data field in the first UHR ELR PPDU may be 2; the granularity of duplication transmission of the data field in the first UHR ELR PPDU may be 160 MHz, and the number N of duplication transmissions of the data field in the first UHR ELR PPDU may be 4; or, the granularity of duplication transmission of the data field in the first UHR ELR PPDU may be 80 MHZ, and the number N of duplication transmissions of the data field in the first UHR ELR PPDU may be 8.

It may be noted that, association relationships as illustrated in Table 1 are merely taken as an example, and the disclosure is not limited in this regard. In practice, only part of the association relationships in Table 1 may be included, for example, only an association relationship between a bandwidth of a UHR PPDU and the granularity B of duplication transmission is included. Alternatively, only an association relationship between the bandwidth of the UHR PPDU and the number N of duplication transmissions may be included. Alternatively, only an association relationship corresponding to part of the above bandwidths of the UHR PPDU may be included, for example, only an association relationship when the bandwidth of the UHR PPDU is greater than 80 MHz (or greater than 40 MHz or greater than 160 MHz) is included. Alternatively, when the bandwidth of the UHR PPDU is greater than 640 MHz, Table 1 may further contain more association relationships, and the disclosure is not limited in this regard.

In some embodiments, the association relationships in Table 1 may be pre-defined. When the granularity of duplication transmission or the number of duplication transmissions are undefined in some cases, duplication transmission may not be performed by default. Alternatively, duplication transmission may be performed by default based on the pre-defined granularity of duplication transmission or the pre-defined number of duplication transmissions.

In some embodiments, a UHR modulated field in the first UHR ELR PPDU includes the data field, a UHR-STF, and a UHR-LTF, and a granularity of each of the UHR-STF, the UHR-LTF, and a pilot subcarrier of the UHR modulated field is the first frequency-domain resource unit.

That is to say, the data field, the UHR-STF, and the UHR-LTF in the UHR modulated field, as well as the pilot subcarrier of the UHR modulated field are all constructed based on the bandwidth of the first frequency-domain resource unit.

In some other embodiments, a granularity of each of the UHR-STF and the UHR-LTF in the UHR modulated field in the first UHR ELR PPDU and the pilot subcarrier of the UHR modulated field is a second frequency-domain resource unit.

That is to say, the data field in the UHR modulated field is constructed based on the bandwidth of the first frequency-domain resource unit, and the UHR-STF and the UHR-LTF in the UHR modulated field and the pilot subcarrier of the UHR modulated field are constructed based on a bandwidth of the second frequency-domain resource unit.

In some embodiments, the bandwidth of the second frequency-domain resource unit is determined based on the bandwidth of the first UHR ELR PPDU.

For example, the bandwidth of the second frequency-domain resource unit is equal to the bandwidth of the first UHR ELR PPDU, or is equal to half the bandwidth of the first UHR ELR PPDU.

The specific implementation of a construction granularity of each field in the UHR modulated field will be described in combination with specific examples illustrated in FIG. 6 to FIG. 10.

Figure 6:
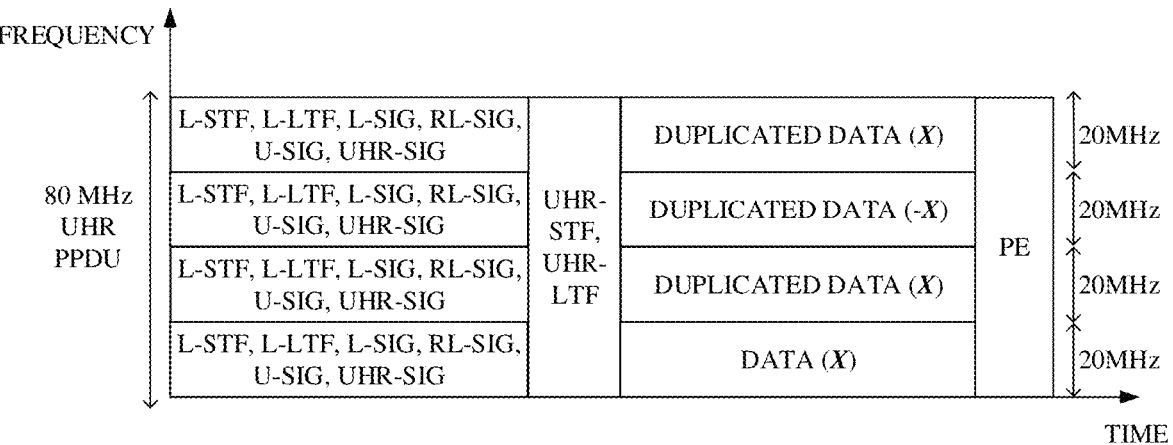
FIGS. 6 to 10 are schematic diagrams of a granularity of each field in a UHR modulated field provided in embodiments of the disclosure.
Figure 7:
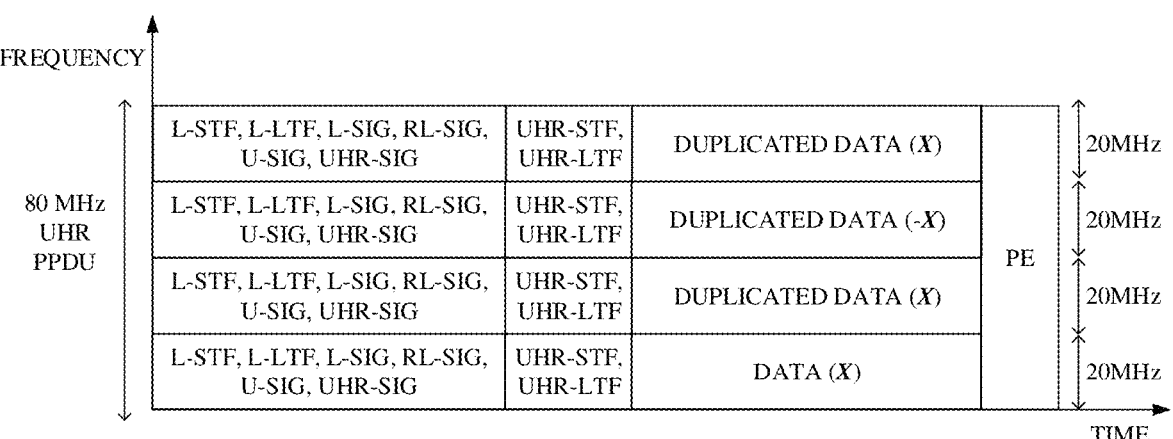
Figure 8:
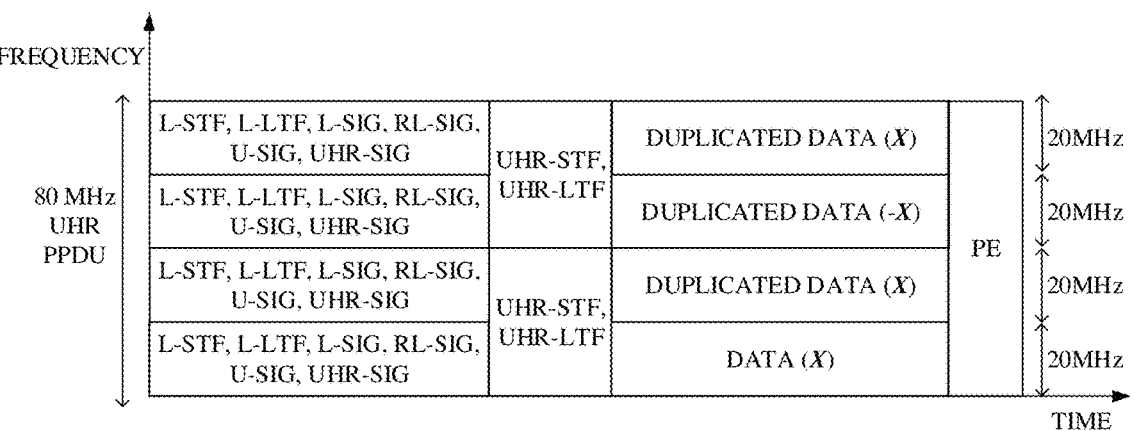

In the examples of FIG. 6 to FIG. 8, the bandwidth of the first UHR ELR PPDU is 80 MHz, the granularity of duplication transmission (i.e., the first frequency-domain resource unit) of the data field is 20 MHz, and the number N of duplication transmissions of the data field is equal to 4. The transmitter encodes the data field in the first 20 MHz subchannel, where the encoded data field is denoted by X. Then, the transmitter duplicates X to the second, third, and fourth 20 MHz subchannels in the frequency domain, respectively, and applies a corresponding phase rotation, for example, [1,1,−1,1].

In the example of FIG. 6, the UHR-STF, the UHR-LTF, and the pilot subcarrier in the UHR modulated field are all constructed based on the bandwidth 80 MHz of the first UHR ELR PPDU.

In the example of FIG. 7, the UHR-STF, the UHR-LTF, and the pilot subcarrier in the UHR modulated field are constructed based on the granularity (i.e., 20 MHZ) of duplication transmission of the data field.

In the example of FIG. 8, the UHR-STF, the UHR-LTF, and the pilot subcarrier in the UHR modulated field are constructed based on 40 MHz, which is twice the granularity (i.e., 20 MHz) of duplication transmission of the data field, and in other words, constructed based on half the bandwidth of the first UHR ELR PPDU.

Figure 9:
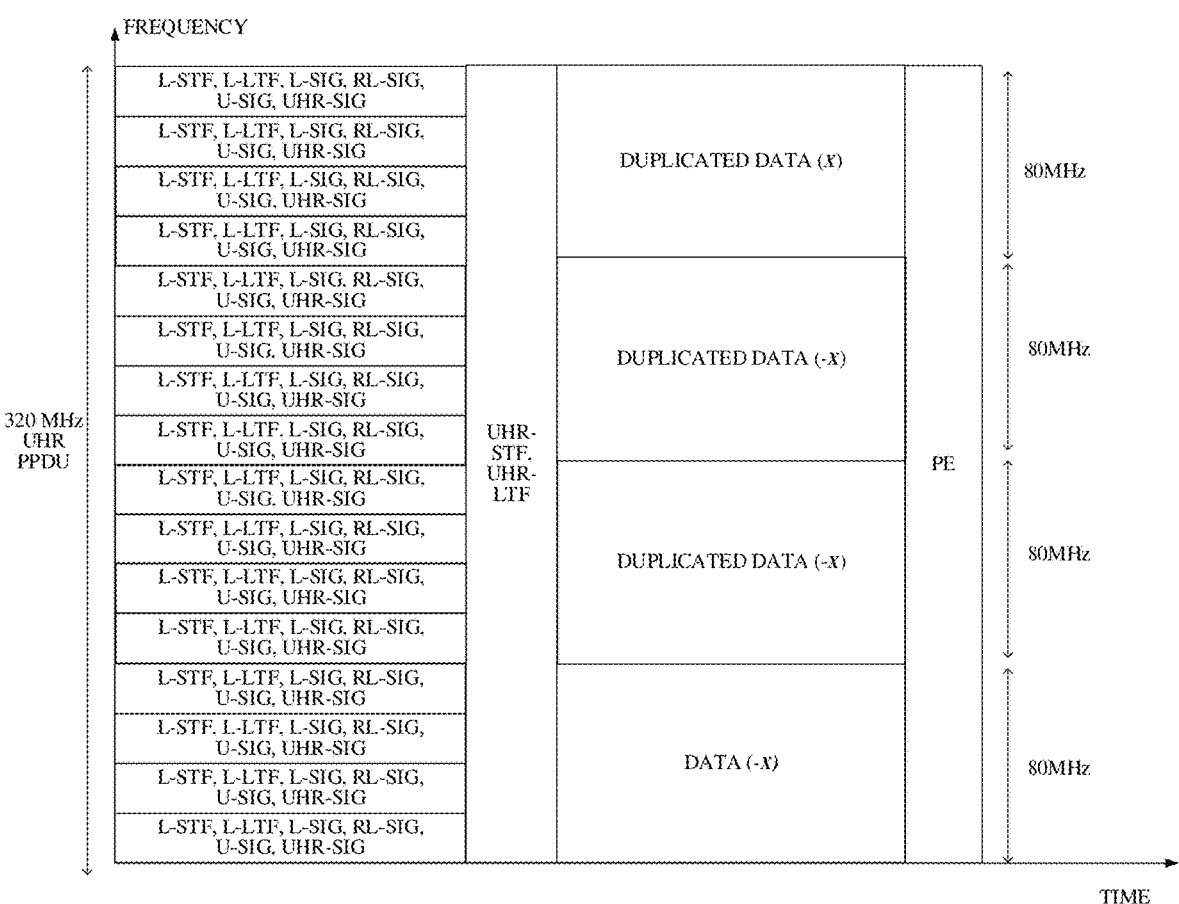
Figure 10:
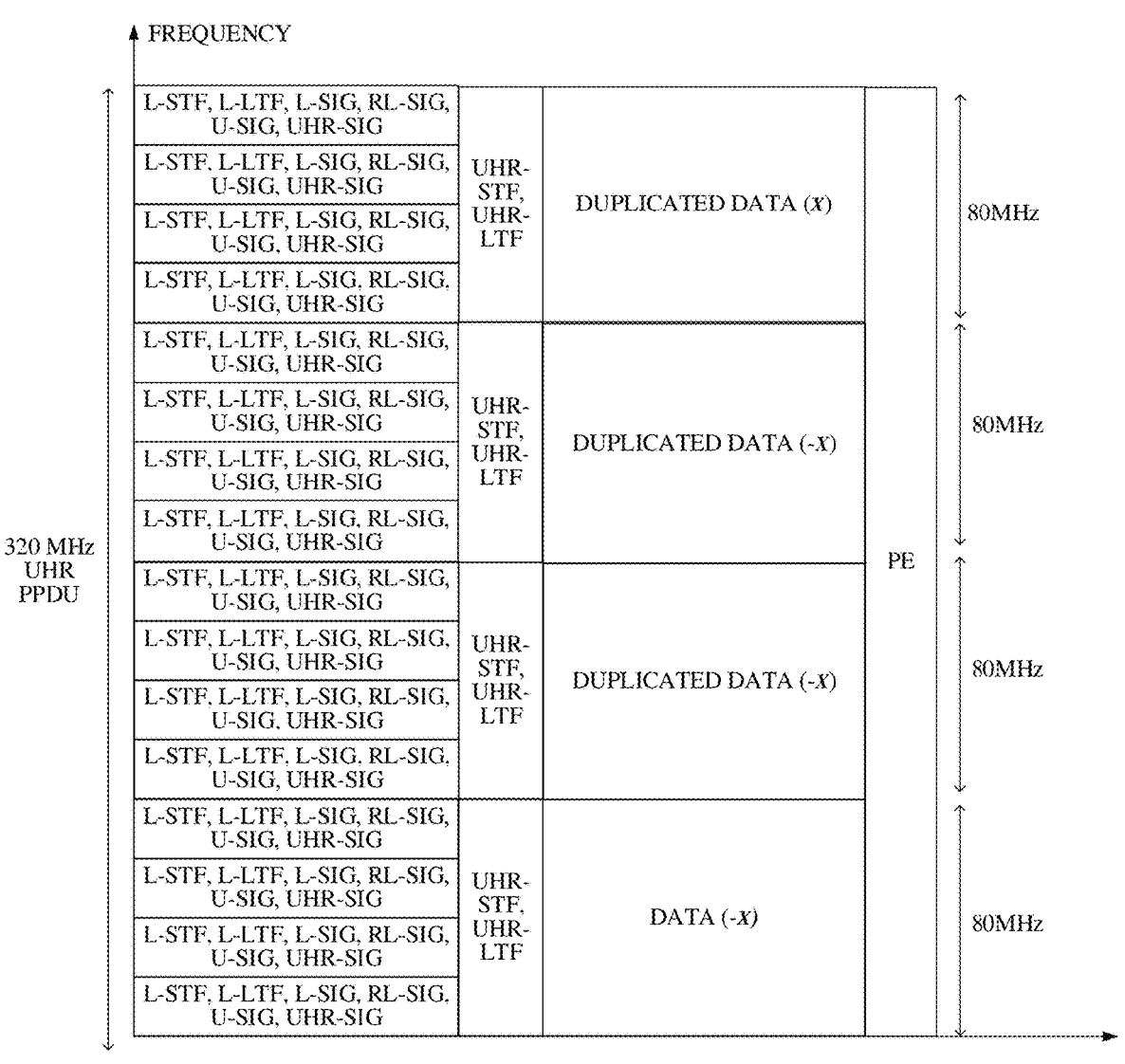

In the examples of FIG. 9 and FIG. 10, the bandwidth of the first UHR ELR PPDU is 320 MHz, the granularity of duplication transmission (i.e., the first frequency-domain resource unit) of the data field is 80 MHz, and the number N of duplication transmissions of the data field is equal to 4. The data field is encoded in the first 80 MHz subchannel, where the encoded data field is denoted by X. Then, X is duplicated to the second, third, and fourth 80 MHz subchannels in the frequency domain, respectively, and a corresponding phase rotation is applied, for example, [−1,−1,−1, 1].

In the example of FIG. 9, the UHR-STF, the UHR-LTF, and the pilot subcarrier in the UHR modulated field are all constructed based on the bandwidth 320 MHz of the first UHR ELR PPDU.

In the example of FIG. 10, the UHR-STF, the UHR-LTF, and the pilot subcarrier in the UHR modulated field are constructed based on the granularity (i.e., 80 MHZ) of duplication transmission of the data field.

In some embodiments, the first UHR ELR PPDU contains first information. The first information indicates duplication transmission configuration of the first UHR ELR PPDU, for example, whether a duplication transmission mode is used for the first UHR ELR PPDU, the granularity of duplication transmission, and the number of duplication transmissions of the data field, etc.

In some embodiments, the first information includes at least one of: first indication information indicating a duplication transmission mode for the first UHR ELR PPDU or a duplication transmission mode for the data field in the first UHR ELR PPDU; second indication information indicating the number N of duplication transmissions of the data field in the first UHR ELR PPDU; or third indication information indicating a bandwidth of the first frequency-domain resource unit.

In some embodiments, the duplication transmission mode for the first UHR ELR PPDU may refer to whether the duplication transmission mode is enabled (or activated or used) for the first UHR ELR PPDU, in other words, whether the duplication transmission mode is enabled (or activated or used) for the data field in the first UHR ELR PPDU.

In some embodiments, the third indication information may indicate the granularity of duplication transmission of the data field, for example, a bandwidth of a subchannel.

In some embodiments, the first indication information may be carried in an existing field (for example, a reserved field or a reserved bit) in the first UHR ELR PPDU, or the first indication information may be carried in a newly-added field in the first UHR ELR PPDU, which is not limited in the disclosure.

In some embodiments, the first indication information is carried in a UHR-SIG field or a U-SIG field in the first UHR ELR PPDU.

For example, the first indication information may be carried in a reserved field of the UHR-SIG field or the U-SIG field.

In some embodiments, the second indication information may be carried in an existing field (for example, a reserved field or a reserved bit) in the first UHR ELR PPDU, or the second indication information may be carried in a newly-added field in the first UHR ELR PPDU, which is not limited in the disclosure.

In some embodiments, the second indication information is carried in a UHR-SIG field or a U-SIG field in the first UHR ELR PPDU.

For example, the second indication information may be carried in a reserved field of the UHR-SIG field or the U-SIG field.

In some embodiments, the third indication information may be carried in an existing field (for example, a reserved field or a reserved bit) in the first UHR ELR PPDU, or the third indication information may be carried in a newly-added field in the first UHR ELR PPDU, which is not limited in the disclosure.

In some embodiments, the third indication information is carried in a UHR-SIG field or a U-SIG field in the first UHR ELR PPDU.

For example, the third indication information may be carried in a reserved field of the UHR-SIG field or the U-SIG field.

In some embodiments, the first UHR ELR PPDU contains at least one of: a duplication transmission mode field indicating a duplication transmission mode for the first UHR ELR PPDU; a number of duplications field indicating the number N of duplication transmissions of the data field in the first UHR ELR PPDU; or a granularity of duplication field indicating a bandwidth of a frequency-domain resource unit for duplication transmission of the data field in the first UHR ELR PPDU.

In some embodiments, the duplication transmission mode field is carried in a UHR-SIG field or a U-SIG field in the first UHR ELR PPDU.

In some embodiments, the number of duplications field is carried in a UHR-SIG field or a U-SIG field in the first UHR ELR PPDU.

In some embodiments, the granularity of duplication field is carried in a UHR-SIG field or a U-SIG field in the first UHR ELR PPDU.

In some embodiments, the duplication transmission mode field may be of one bit, and different values of the one bit indicate whether the duplication transmission mode is enabled (or activated or used) for the first UHR ELR PPDU. For example, value "1" indicates enabling the duplication transmission mode, and value "0" indicates disabling the duplication transmission mode. For another example, value "0" indicates enabling the duplication transmission mode, and value "1" indicates disabling the duplication transmission mode.

In some embodiments, the number of duplications field may be of X bit(s), and different values of the X bit(s) indicate different numbers of duplication transmissions. A value of X can be determined based on the number of possible values of N. For example, when N has two possible values (for example, 2 and 4), the number of duplications field may be of one bit. Alternatively, when N has three possible values (for example, 2, 4, and 8), the number of duplications field may be of two bits.

As a specific example, the number of duplications field is of one bit, which indicates 2 duplication transmissions and 4 duplication transmissions respectively.

For example, value "1" of the one bit indicates 2 duplication transmissions, and value "0" of the one bit indicates 4 duplication transmissions.

For another example, value "0" of the one bit indicates 2 duplication transmissions, and value "1" of the one bit indicates 4 duplication transmissions.

In some embodiments, when the bandwidth of the first UHR ELR PPDU is 20 MHZ, the duplication transmission mode field and the number of duplications field are set to all 1s, all 0s, or other invalid values, and the receiver disregards the parsing of the two fields.

The format design of a UHR PPDU carrying the duplication transmission configuration will be described below in combination with specific embodiments.

Embodiment 1-1: the first UHR ELR PPDU contains a duplication transmission mode field and a number of duplications field.

That is, the transmitter can indicate, via the first UHR ELR PPDU, a duplication transmission mode for the data field and the number of duplication transmissions of the data field to the receiver.

In this case, the granularity B of duplication transmission can be determined based on the number N of duplication transmissions and the bandwidth BW of the first UHR ELR PPDU.

For example, the granularity B of duplication transmission=BW/N.

In some embodiments, both the duplication transmission mode field and the number of duplications field are carried in a U-SIG field.

For example, B20 of the U-SIG field can indicate a duplication transmission mode, and B21 of the U-SIG field can indicate the number of duplication transmissions.

Table 2 illustrates a schematic format of a U-SIG field carrying a duplication transmission mode field and a number of duplications field provided in embodiments of the disclosure.

TABLE 2

| Two parts of U-SIG | Bit | Field | Number of bits | Description |
|---|---|---|---|---|
| U-SIG-1 | B0-B2 | PHY version identifier | 3 | Differentiate between different PHY versions |
| | B3-B5 | BW | 3 | Indicate a bandwidth (BW) of a PPDU |
| | B6 | UL/DL | 1 | Indicate whether the PPDU is UL or DL |
| | B7-B12 | BSS color | 6 | An identifier of a basic service set (BSS) |
| | B13-B19 | TXOP | 7 | Indicate duration information of a TXOP and a value of a network allocation vector (NAV) |
| | B20 | Duplication transmission mode | 1 | Indicate a duplication transmission mode for the PPDU |
| | B21 | Number of duplications | 1 | Indicate the number of duplication transmissions of a data field in the PPDU |

TABLE 2-continued

| Two parts of U-SIG | Bit | Field | Number of bits | Description |
|---|---|---|---|---|
| | B22-B24 | Disregard | 3 | Set to all 1s and treat as disregard |
| | B25 | Validate | 1 | Set to all 1s and treat as validate |
| U-SIG-2 | B0-B1 | PPDU type and compression mode | 2 | |
| | B2 | Validate | 1 | Set to all 1s and treat as validate |
| | B3-B7 | Punctured channel information | 5 | |
| | B8 | Validate | 1 | Set to all 1s and treat as validate |
| | B9-B10 | UHR-SIG MCS | 2 | Indicate an MCS used for modulating the UHR-SIG |
| | B11-B15 | Number of UHR-SIG symbols | 5 | Indicate the number of UHR-SIG symbols |
| | B16-B19 | Cyclical redundancy check (CRC) | 4 | |
| | B20-B25 | Tail | 6 | |

In some embodiments, the duplication transmission mode field may be of one bit. When the BW field in the first UHR ELR PPDU is set to a non-zero value (i.e., the bandwidth of the first UHR ELR PPDU is not 20 MHz), a value of the duplication transmission mode field is a valid value. For example, when the duplication transmission mode field is set to 0, it indicates enabling a duplication transmission mode, and when the duplication transmission mode field is set to 1, it indicates disabling the duplication transmission mode. Alternatively, when the duplication transmission mode field is set to 1, it indicates enabling the duplication transmission mode, and when the duplication transmission mode field is set to 0, it indicates disabling the duplication transmission mode.

In some embodiments, the number of duplications field may be of one bit. When the BW field in the first UHR ELR PPDU is set to a value other than 1 (i.e., the bandwidth of the first UHR ELR PPDU is not 40 MHZ), a value of the number of duplications field is a valid value. For example, when the number of duplications field is set to 0, it indicates that the number of duplication transmissions is 2, and when the number of duplications field is set to 1, it indicates that the number of duplication transmissions is 4. Alternatively, when the number of duplications field is set to 1, it indicates that the number of duplication transmissions is 2, and when the number of duplications field is set to 0, it indicates that the number of duplication transmissions is 4.

Optionally, in the case where the bandwidth of the first UHR ELR PPDU is 40 MHZ, when the number of duplications field is set to 0, it indicates that the number of duplication transmissions is 1, and value "1" indicates disregard; or, when the number of duplications field is set to 1, it indicates that the number of duplication transmissions is 1, and value "0" indicates disregard.

In some embodiments, when the BW field in the first UHR ELR PPDU is set to a zero value (i.e., the bandwidth of the first UHR ELR PPDU is 20 MHz), the duplication transmission mode field and the number of duplications field are set to all 1s, all 0s, or other invalid values, and the receiver disregards the parsing of the two fields.

It may be understood that, lengths and positions of the duplication transmission mode field and the number of duplications field illustrated in Table 2 are merely examples, and the disclosure is not limited in this regard. The number of duplications field may also be of other lengths, for example, 2 bits or more bits, and the positions of the two fields may also be swapped.

In some other embodiments, both the duplication transmission mode field the number of duplications field are carried in a UHR-SIG field.

For example, the duplication transmission mode field the number of duplications field are carried in a common field in the UHR-SIG field, which is applicable to a scenario of UHR SU transmission.

In a specific embodiment, B13 of the common field in the UHR-SIG field can indicate a duplication transmission mode, and B14 of the common field in the UHR-SIG field can indicate the number of duplication transmissions.

Table 3 illustrates a schematic format of a common field in a UHR-SIG field carrying a duplication transmission mode field and a number of duplications field provided in embodiments of the disclosure.

TABLE 3

| Bit | Field | Number of bits | Description |
|---|---|---|---|
| B0-B3 | Spatial reuse | 4 | Indicate whether a spatial reuse mode is allowed in a subband of a PPDU during the transmission of this PPDU |
| B4-B5 | GI + LTF size | 2 | Indicate the GI duration and EHT-LTF size |
| B6-B8 | Number of EHT-LTF symbols | 3 | Indicate the number of EHT-LTF symbols |
| B9 | LDPC extra symbol segment | 1 | Indicate whether an LDPC extra symbol segment is present |
| B10 B11 | Pre-FEC padding factor | 2 | Indicate a pre-forward-error-correction (pre-FEC) padding factor |
| B12 | PE disambiguity | 1 | Indicate PE disambiguity |
| B13 | Duplication transmission mode | 1 | Indicate a duplication transmission mode for the PPDU |

TABLE 3-continued

| Bit | Field | Number of bits | Description |
|---|---|---|---|
| B14 | Number of duplications | 1 | Indicate the number of duplication transmissions of a data field in the PPDU |
| B15-B16 | Disregard | 2 | Set to all 1s |
| B17-B19 | Number of non-OFDMA users | 3 | Indicate the total number of non-OFDMA users |

For the specific implementations of the duplication transmission mode field and the number of duplications field in Table 3, reference can be made to the related illustrations in Table 2, which will not be repeated herein for the sake of brevity.

It may be understood that, lengths and positions of the duplication transmission mode field and the number of duplications field illustrated in Table 3 are merely examples, and the disclosure is not limited in this regard. The number of duplications field may also be of other lengths, for example, 2 bits or more bits, and the positions of the two fields may also be swapped.

In some embodiments, the GI+LTF size field is set to 0 to indicate 2×LTF+0.8 μs GI, set to 1 to indicate 2×LTF+1.6 μs GI, set to 2 to indicate 4×LTF+0.8 μs GI, or set to 3 to indicate 4×LTF+3.2 μs GI.

In some embodiments, the number of EHT-LTF symbols field is set to 0 to indicate 1 EHT-LTF symbol, set to 1 to indicate 2 EHT-LTF symbols, set to 2 to indicate 4 EHT-LTF symbols, set to 3 to indicate 6 EHT-LTF symbols, or set to 4 to indicate 8 EHT-LTF symbols. Values 5-7 are valid.

In some embodiments, when the LDPC extra symbol segment field is set to 1, it indicates that an LDPC extra symbol segment is present. When the LDPC extra symbol segment field is set to 0, it indicates that the LDPC extra symbol segment is absent.

In some embodiments, the pre-FEC padding factor field is set to 0 to indicate a pre-FEC padding factor of 4, set to 1 to indicate a pre-FEC padding factor of 1, set to 2 to indicate a pre-FEC padding factor of 2, or set to 3 to indicate a pre-FEC padding factor of 3.

In some embodiments, the number of non-OFDMA users field is set to n to indicate n+1 non-OFDMA users. For a non-OFDMA transmission to a single user, the number of non-OFDMA users field is set to 0 to indicate a UHR SU transmission. For a non-OFDMA transmission to multiple users, the number of non-OFDMA users field is set to a value greater than 0 to indicate more than one non-OFDMA users for non-OFDMA transmission to multiple users.

Embodiment 1-2: the first UHR ELR PPDU contains a duplication transmission mode field and a granularity of duplication field.

That is, the transmitter can indicate, via the first UHR ELR PPDU, a duplication transmission mode for the data field and the granularity of duplication transmission (for example, a bandwidth B of a subchannel) of the data field to the receiver.

In this case, the number N of duplication transmissions can be determined based on the granularity B of duplication transmission and the bandwidth BW of the first UHR ELR PPDU.

For example, the number N of duplication transmissions=BW/B.

In some embodiments, both the duplication transmission mode field and the granularity of duplication field are carried in a U-SIG field.

For example, B20 of the U-SIG field can indicate a duplication transmission mode, and B21 of the U-SIG field can indicate a granularity of duplication transmission.

Table 4 illustrates a schematic format of a U-SIG field carrying a duplication transmission mode field and a granularity of duplication field provided in embodiments of the disclosure.

TABLE 4

| Two parts of U-SIG | Bit | Field | Number of bits | Description |
|---|---|---|---|---|
| U-SIG-1 | B0-B2 | PHY version identifier | 3 | Differentiate between different PHY versions |
| | B3-B5 | BW | 3 | Indicate a bandwidth of a PPDU |
| | B6 | UL/DL | 1 | Indicate whether the PPDU is UL or DL |
| | B7-B12 | BSS color | 6 | An identifier of a BSS |
| | B13-B19 | TXOP | 7 | Indicate duration information of a TXOP and a value of an NAV |
| | B20 | Duplication transmission mode | 1 | Indicate a duplication transmission mode for the PPDU |
| | B21 | Granularity of duplication | 1 | Indicate a granularity of duplication transmission of a data field in the PPDU |
| | B22-B24 | Disregard | 3 | Set to all 1s and treat as disregard |
| | B25 | Validate | 1 | Set to all 1s and treat as validate |
| U-SIG-2 | B0-B1 | PPDU type and compression mode | 2 | |
| | B2 | Validate | 1 | Set to all 1s and treat as validate |

TABLE 4-continued

| Two parts of U-SIG | Bit | Field | Number of bits | Description |
|---|---|---|---|---|
| | B3-B7 | Punctured channel information | 5 | |
| | B8 | Validate | 1 | Set to all 1s and treat as validate |
| | B9-B10 | UHR-SIG MCS | 2 | Indicate an MCS used for modulating the UHR-SIG |
| | B11-B15 | Number of UHR-SIG symbols | 5 | Indicate the number of UHR-SIG symbols |
| | B16-B19 | CRC | 4 | |
| | B20-B25 | Tail | 6 | |

In some embodiments, the BW field is set to 0 for 20 MHz, set to 1 for 40 MHz, set to 2 for 80 MHz, set to 3 for 160 MHz, set to 4 for 320 MHz-1, or set to 5 for 320 MHz-2. Values 6 and 7 are valid.

In some embodiments, the duplication transmission mode field may be of one bit. When the BW field in the first UHR ELR PPDU is set to a non-zero value (i.e., the bandwidth of the first UHR ELR PPDU is not 20 MHz), a value of the duplication transmission mode field is a valid value. For example, when the duplication transmission mode field is set to 0, it indicates enabling a duplication transmission mode, and when the duplication transmission mode field is set to 1, it indicates disabling the duplication transmission mode. Alternatively, when the duplication transmission mode field is set to 1, it indicates enabling the duplication transmission mode, and when the duplication transmission mode field is set to 0, it indicates disabling the duplication transmission mode.

In some embodiments, the granularity of duplication field may be of one bit, and different values of the one bit indicate different granularities of duplication transmission. For example, when the granularity of duplication field is set to 0, it indicates that the granularity of duplication transmission is 20 MHz, and when the granularity of duplication field is set to 1, it indicates that the granularity of duplication transmission is 40 MHz.

Optionally, in the case where the bandwidth of the first UHR ELR PPDU is 40 MHZ, when the granularity of duplication field indicates 40 MHz, it indicates that the number of duplication transmissions is 1, that is, duplication transmission is not performed.

In some embodiments, when the bandwidth of the first UHR ELR PPDU that is subject to puncturing is not an integer multiple of the granularity of duplication transmission, duplication transmission is not allowed.

It may be understood that, lengths and positions of the duplication transmission mode field and the granularity of duplication field illustrated in Table 4 are merely examples, and the disclosure is not limited in this regard. The granularity of duplication field may also be of other lengths, for example, 2 bits or more bits, and the positions of the two fields may also be swapped.

In some other embodiments, both the duplication transmission mode field and the granularity of duplication field are carried in a UHR-SIG field.

For example, the duplication transmission mode field and the granularity of duplication field are carried in a common field in the UHR-SIG field, which is applicable to a scenario of UHR SU transmission.

In a specific embodiment, B13 of the common field in the UHR-SIG field can indicate a duplication transmission mode, and B14 of the common field in the UHR-SIG field can indicate a granularity of duplication transmission.

Table 5 illustrates a schematic format of a common field in a UHR-SIG field carrying a duplication transmission mode field and a granularity of duplication field provided in embodiments of the disclosure.

TABLE 5

| Bit | Field | Number of bits | Description |
|---|---|---|---|
| B0-B3 | Spatial reuse | 4 | Indicate whether a spatial reuse mode is allowed in a subband of a PPDU during the transmission of this PPDU |
| B4-B5 | GI + LTF size | 2 | Indicate the GI duration and EHT-LTF size |
| B6-B8 | Number of EHT-LTF symbols | 3 | Indicate the number of EHT-LTF symbols |
| B9 | LDPC extra symbol segment | 1 | Indicate whether an LDPC extra symbol segment is present |
| B10-B11 | pre-FEC padding factor | 2 | Indicate a pre-FEC padding factor |
| B12 | PE disambiguity | 1 | Indicate PE disambiguity |
| B13 | Duplication transmission mode | 1 | Indicate a duplication transmission mode for the PPDU |
| B14 | Granularity of duplication | 1 | Indicate a granularity of duplication transmission of a data field in the PPDU |
| B15-B16 | Disregard | 2 | Set to all 1s |
| B17-B19 | Number of non-OFDMA users | 3 | Indicate the total number of non-OFDMA users |

For the specific implementations of the duplication transmission mode field and the granularity of duplication field in Table 5, reference can be made to the illustrations in Table 4, and for the meanings of other fields in Table 5, reference can be made to the illustrations of corresponding fields in Table 3, which will not be repeated herein for the sake of brevity.

It may be understood that, lengths and positions of the duplication transmission mode field and the granularity of duplication field illustrated in Table 5 are merely examples, and the disclosure is not limited in this regard. The granularity of duplication field may also be of other lengths, for example, 2 bits or more bits, and the positions of the two fields may also be swapped.

Embodiment 1-3: the first UHR ELR PPDU contains a duplication transmission mode field.

That is, the transmitter can indicate, via the first UHR ELR PPDU, a duplication transmission mode for the data field to the receiver.

In this case, the transmitter and the receiver can perform duplication transmission and reception based on a pre-defined granularity of duplication transmission and/or the pre-defined number N of duplication transmissions, or determine a granularity of duplication transmission and/or the number N of duplication transmissions of the data field in the first UHR ELR PPDU according to a preset rule. For example, the granularity of duplication transmission and/or the number N of duplication transmissions of the data field is determined based on the bandwidth of the first UHR ELR PPDU. For example, the granularity of duplication transmission and/or the number N of duplication transmissions of the data field is determined based on the bandwidth of the first UHR ELR PPDU in combination with Table 1.

In some embodiments, the pre-defined number of duplication transmissions is 4.

When the bandwidth of the first UHR ELR PPDU is 80 MHZ, the data field is encoded in the first 20 MHz subchannel in frequency domain, from low to high and then duplicated to the second, third, and fourth 20 MHz subchannels, and a corresponding phase rotation is applied. A UHR-STF and a UHR-LTF in the UHR modulated field and a pilot subcarrier of the UHR modulated field are constructed in an identical manner to those of an OFDMA transmission using an 80 MHz UHR MU PPDU with 242-tone RU 1, 242-tone RU 2, 242-tone RU 3, and 242-tone RU 4 occupied. Alternatively, the UHR-STF, the UHR-LTF, and the pilot subcarrier in the UHR modulated field are constructed based on 80 MHz.

When the bandwidth of the first UHR ELR PPDU is 160 MHz, the data field is encoded in the first 40 MHz subchannel in frequency domain, from low to high, and then duplicated to the second, third, and fourth 40 MHz subchannels, and a corresponding phase rotation is applied. A UHR-STF, a UHR-LTF, and a pilot subcarrier in the UHR modulated field are constructed in an identical manner to those of an OFDMA transmission using a 160 MHz UHR MU PPDU with 484-tone RU 1, 484-tone RU 2, 484-tone RU 3, and 484-tone RU 4 occupied. Alternatively, the UHR-STF, the UHR-LTF, and the pilot subcarrier in the UHR modulated field are constructed based on 160 MHz.

When the bandwidth of the first UHR ELR PPDU is 320 MHz, the data field is encoded in the first 80 MHz subchannel in frequency domain, from low to high, and then duplicated to the second, third, and fourth 80 MHz subchannels, and a corresponding phase rotation is applied. A UHR-STF, a UHR-LTF, and a pilot subcarrier in the UHR modulated field are constructed in an identical manner to those of an OFDMA transmission using a 320 MHz UHR MU PPDU with 996-tone RU 1, 996-tone RU 2, 996-tone RU 3, and 996-tone RU 4 occupied. Alternatively, the UHR-STF, the UHR-LTF, and the pilot subcarrier in the UHR modulated field are constructed based on 320 MHz.

When the bandwidth of the first UHR ELR PPDU is 480 MHz, the data field is encoded in the first 120 MHz subchannel in frequency domain, from low to high, and then duplicated to the second, third, and fourth 120 MHz subchannels, and a corresponding phase rotation is applied. A UHR-STF, a UHR-LTF, and a pilot subcarrier in the UHR modulated field are constructed in an identical manner to those of an OFDMA transmission using a 480 MHz UHR MU PPDU with 996+484-tone MRU 1, 996+484-tone RU 2, 996+484-tone RU 3, and 996+484-tone RU 4 occupied. Alternatively, the UHR-STF, the UHR-LTF, and the pilot subcarrier in the UHR modulated field are constructed based on 480 MHz.

When the bandwidth of the first UHR ELR PPDU is 640 MHz, the data field is encoded in the first 160 MHz subchannel in frequency domain, from low to high, and then duplicated to the second, third, and fourth 160 MHz subchannels, and a corresponding phase rotation is applied. A UHR-STF, a UHR-LTF, and a pilot subcarrier in the UHR modulated field are constructed in an identical manner to those of an OFDMA transmission using a 640 MHz UHR MU PPDU with 2×996-tone RU 1, 2×996-tone RU 2, 2×996-tone RU 3, and 2×996-tone RU 4 occupied. Alternatively, the UHR-STF, the UHR-LTF, and the pilot subcarrier in the UHR modulated field are constructed based on 640 MHz.

Embodiment 2: the first frequency-domain resource unit is an RU/MRU.

That is, the transmitter can perform duplication transmission of a UHR PPDU at a granularity of the RU/MRU, thereby improving the reliability of transmission of the UHR PPDU, and reducing a transmission latency caused by data retransmission.

In some embodiments, the transmitter transmits the data field N times in N RUs/MRUs, where each transmission occupies one RU/MRU. For example, the data field is encoded in the first RU/MRU and then duplicated to the second, third, . . . , N-th RUs/MRUs. For example, during duplication of the data field to the other N−1 RUs/MRUs, a certain phase rotation may be applied. That is, data fields in the other N−1 RUs/MRUs may have a certain phase rotation relative to the data field in the first RU/MRU.

In some embodiments, RUs or MRUs for N transmissions of the data field are located in different 20 MHz subchannels. As such, in case of interference on one of the 20 MHz subchannels, the receiver can still receive complete data using RUs or MRUs in other 20 MHz subchannels, thereby ensuring that the receiver can correctly decode the data, avoiding the problem of a relatively long transmission latency caused by multiple retransmissions of the data by the transmitter, and ensuring the reliability of data transmission.

In embodiment 2, the first UHR ELR PPDU may be a UHR MU PPDU, i.e., for carrying data of one or more users.

In this case, when the first UHR ELR PPDU carries data of multiple users, all of the data of the multiple users may be transmitted in a duplication transmission mode, or part of the data of the multiple users may be transmitted in the duplication transmission mode. Optionally, the number of duplication transmissions of data of different users may be the same or different.

In some scenarios, the transmitter is an AP, and the AP can transmit a first UHR ELR PPDU to multiple STAs. The first UHR ELR PPDU contains data to be transmitted to the multiple STAs. All of the data to be transmitted to the multiple STAs may be transmitted in a duplication transmission mode, or part of the data to be transmitted to the multiple STAs may be transmitted in the duplication transmission mode.

Figure 11:
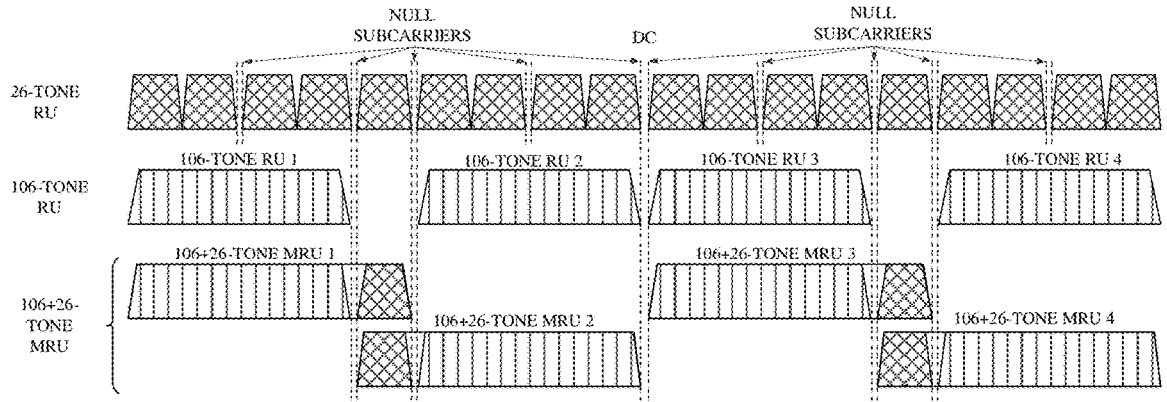
FIG. 11 is a schematic diagram of N multiple resource units (MRUs) for N duplication transmissions of a data field provided in embodiments of the disclosure.

FIG. 11 is a schematic diagram of N MRUs for N duplication transmissions of a data field provided in embodiments of the disclosure. In this example, a bandwidth of a first UHR ELR PPDU is 40 MHz, and N=2. During the 40 MHz UHR PPDU OFDMA duplication transmission, an AP allocates 106+26-tone MRU 1 and 106+26-tone MRU 3 for data to be transmitted to STA1, which are respectively in the first 20 MHz subchannel and the second 20 MHz subchannel; and allocates 106-tone RU 2 and 106-tone RU 4 for data to be transmitted to STA2, which are respectively in the first 20 MHz subchannel and the second 20 MHz subchannel. In this case, for the data to be transmitted to STA1, the AP can perform two duplication transmissions in 106+26-tone MRU 1 in the first 20 MHz subchannel and 106+26-tone MRU 3 in the second 20 MHz subchannel. For the data to be transmitted to STA2, the AP can perform two duplication transmissions in 106-tone RU 2 in the first 20 MHz subchannel and 106-tone RU 4 in the second 20 MHz subchannel.

In some embodiments, RUs/MRUs for N transmissions of the data field are allocated by the transmitter.

For example, for a UHR MU PPDU scenario, RUs/MRUs used for data to be transmitted to different users can be allocated by the transmitter.

In some embodiments, the first UHR ELR PPDU contains second information. The second information indicates duplication transmission configuration of the first UHR ELR PPDU, for example, whether a duplication transmission mode is used for the first UHR ELR PPDU, the RUs/MRUs for N transmissions of the data field, and a receiver of the data field, etc.

In some embodiments, the second information includes at least one of: fourth indication information indicating a duplication transmission mode for the first UHR ELR PPDU or a duplication transmission mode for the data field in the first UHR ELR PPDU; fifth indication information indicating the RUs or MRUs for N transmissions of the data field; or sixth indication information indicating a receiver of the data field.

In some embodiments, the fourth indication information may indicate whether the duplication transmission mode is enabled (or activated or used) for the first UHR ELR PPDU, in other words, whether the duplication transmission mode is enabled (or activated or used) for the data field in the first UHR ELR PPDU.

In some embodiments, for a UHR MU PPDU, the fifth indication information may indicate an RU/MRU for each transmission of a data field to be transmitted to a different user.

In some embodiments, the sixth indication information may indicate identity information of the receiver of the data field.

In some embodiments, the fourth indication information may be carried in an existing field (for example, a reserved field or a reserved bit) in the first UHR ELR PPDU, or the fourth indication information may be carried in a newly-added field in the first UHR ELR PPDU, which is not limited in the disclosure.

In some embodiments, the fourth indication information is carried in a UHR-SIG field or a U-SIG field in the first UHR ELR PPDU.

For example, the fourth indication information may be carried in a reserved field of the UHR-SIG field or the U-SIG field.

In some embodiments, the fourth indication information is carried in a common field or a user field in the UHR-SIG field.

When the fourth indication information is carried in a common field, the fourth indication information is intended for all users in the first UHR ELR PPDU.

That is, when the fourth indication information indicates enabling the duplication transmission mode, the duplication transmission mode is used for all data fields to be transmitted by the transmitter to all users. When the fourth indication information indicates that the duplication transmission mode is disabled, the duplication transmission mode is not used for all the data fields to be transmitted by the transmitter to all users.

When the fourth indication information is carried in a user field, the fourth indication information is intended for a receiver indicated by the user field.

That is, when the fourth indication information indicates enabling the duplication transmission mode, the duplication transmission mode is used for a data field to be transmitted by the transmitter to the receiver indicated by the user field. When the fourth indication information indicates that the duplication transmission mode is disabled, the duplication transmission mode is not used for the data field to be transmitted by the transmitter to the receiver indicated by the user field.

In some embodiments, the first UHR ELR PPDU contains a duplication transmission mode field, which indicates whether a duplication transmission mode is enabled (or activated or used) for the first UHR ELR PPDU.

In some embodiments, the duplication transmission mode field may be of one bit, and different values of the one bit indicate whether the duplication transmission mode is enabled. For example, when the duplication transmission mode field is set to 0, it indicates enabling the duplication transmission mode, and when the duplication transmission mode field is set to 1, it indicates disabling the duplication transmission mode. Alternatively, when the duplication transmission mode field is set to 1, it indicates enabling the duplication transmission mode, and when the duplication transmission mode field is set to 0, it indicates disabling the duplication transmission mode.

In some embodiments, the duplication transmission mode field is carried in a UHR-SIG field or a U-SIG field in the first UHR ELR PPDU.

For example, the duplication transmission mode field is located at B22 of the U-SIG field.

For another example, the duplication transmission mode field is located at B13 of the common field in the UHR-SIG field, or is located at B15 of the user field in the UHR-SIG field.

In some embodiments, the fifth indication information and the sixth indication information are carried in a UHR-SIG field in the first UHR ELR PPDU.

For example, the fifth indication information is carried in a common field of a UHR-SIG field in the first UHR ELR PPDU, and the sixth indication information is carried in a user field of the UHR-SIG field in the first UHR ELR PPDU.

As an example, the common field of the UHR-SIG field in the first UHR ELR PPDU indicates multiple RUs or multiple MRUs, the UHR-SIG field includes multiple user fields, the multiple user fields are in one-to-one correspondence with the multiple RUs or the multiple MRUs, and a data field for a receiver indicated by the multiple user fields is transmitted using corresponding RUs or MRUs.

In some embodiments, when the duplication transmission mode for the first UHR ELR PPDU is enabled, at least two user fields among the multiple user fields indicate the same receiver. As such, data to be transmitted to one receiver can be transmitted using at least two corresponding RUs/MRUs.

In some embodiments, positions of user fields indicating the same receiver may be continuous or discontinuous.

In some embodiments, in the case where data fields for multiple receivers are all transmitted in a duplication transmission mode, the number of RUs/MRUs for the multiple receivers may be the same or different, that is, the number of duplication transmissions of data to be transmitted to the multiple receivers may be the same or different.

Figure 12:
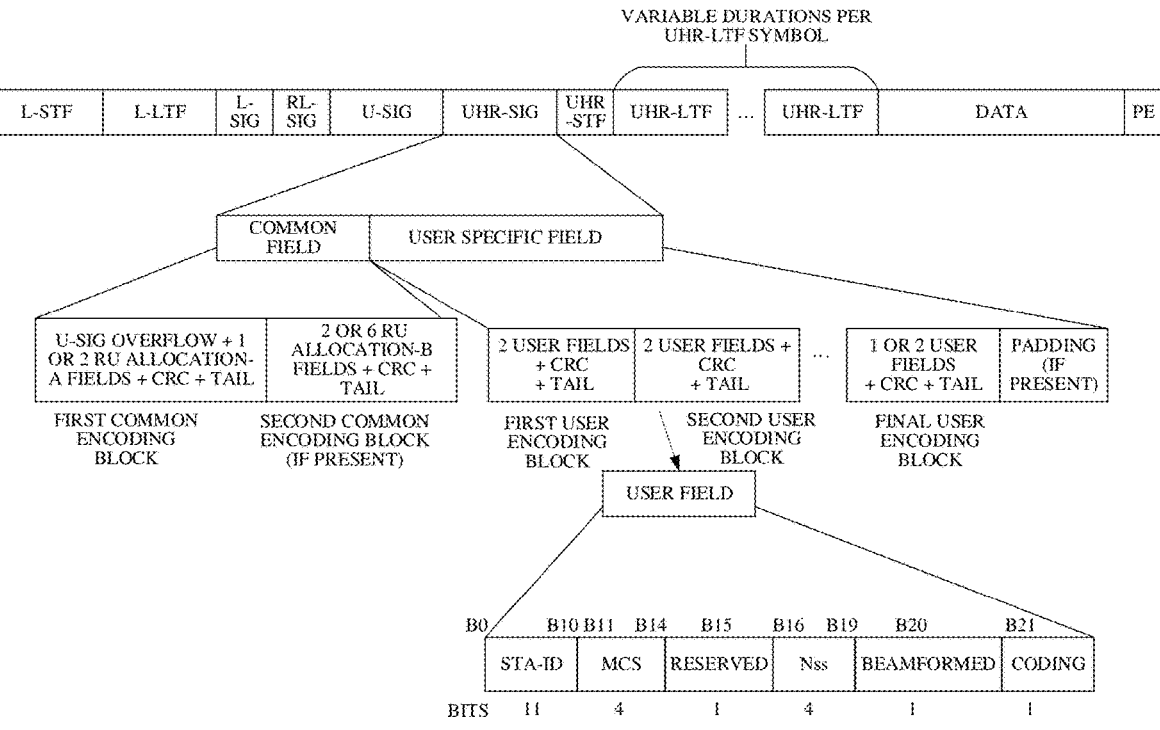
FIG. 12 is a schematic format diagram of a UHR signal (UHR-SIG) field carrying resource units (RUS)/MRUs for duplication transmission of MU data provided in embodiments of the disclosure.

FIG. 12 is a schematic format diagram of a UHR-SIG field carrying RUs/MRUs for duplication transmission of MU data. As illustrated in FIG. 12, a common field of UHR-SIG may include multiple RU allocation fields, where the multiple RU allocation fields indicate multiple RUs/MRUs, and a user specific field of UHR-SIG includes multiple user fields, where each user field includes an STA-ID field which indicates an STA-ID of a receiver. The multiple RU allocation fields are in one-to-one correspondence with the multiple user fields. A data field for a receiver indicated by each user field can be transmitted using an RU/MRU allocated by a corresponding RU allocation field.

After receiving a first UHR ELR PPDU, a receiver needs to decode all user fields, find a position of a user field that matches an ID of the receiver, and further find its own multiple RUs/MRUs in combination with information of RUs/MRUs common to all users indicated by RU allocation fields in the common field of UHR-SIG. Further, the receiver can receive duplicated data for the receiver itself in its own multiple RUs/MRUs.

Figure 13:
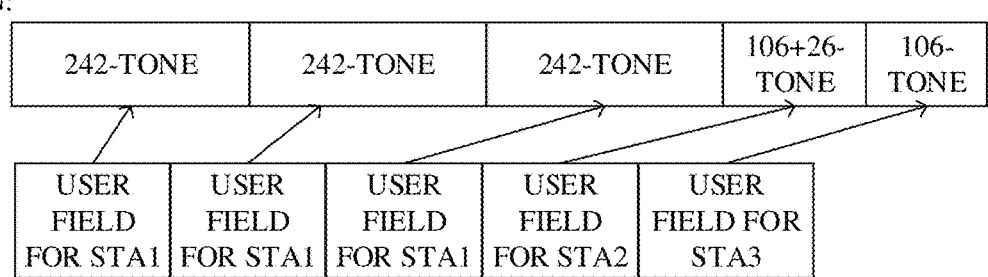
FIG. 13 is a schematic diagram illustrating allocation of corresponding MRUs by an access point (AP) to multiple stations (STAs) provided in embodiments of the disclosure.

As illustrated in FIG. 13, for example, during the 80 MHz OFDMA UHR PPDU duplication transmission, an AP can indicate in a UHR-SIG field six RUs/MRUs to be allocated, including three 242-tone RUs, one 106+26-tone MRU, and one 106-tone RU. The UHR-SIG field includes five user fields. As illustrated in FIG. 13, an STA-ID in each of the first user field, the second user field, and the third user field points to STA1, an STA-ID in the fourth user field points to STA2, and an STA-ID in the fifth user field points to STA3. In this case, data to be transmitted to STA1 can be encoded in one 242-tone RU and then duplicated to the other two 242-tone RUs, data to be transmitted to STA2 can be encoded in one 106+26-tone MRU without duplication transmission, and data to be transmitted to STA3 can be encoded in one 106-tone RU without duplication transmission.

Correspondingly, an STA can determine, based on indication of a duplication transmission mode field, whether a duplication transmission mode is used for a UHR PPDU. In the case where the duplication transmission mode field indicates that the duplication transmission mode is used, the STA needs to decode all the user fields and find multiple user fields that match an STA-ID of the STA. Based on positions of the multiple user fields and RU allocation information indicated by the RU allocation field, the STA finds multiple RUs/MRUs belonging to the STA itself. Further, the STA can receive data for the STA itself in its own multiple RUs/MRUs. The data in the multiple RUs/MRUs is duplicated.

In some embodiments, RUs or MRUs for N transmissions of the data field are allocated by the receiver.

For example, for a UHR TB PPDU scenario (i.e., the first UHR ELR PPDU is a UHR TB PPDU), an AP can allocate to an STA the RUs/MRUs for N transmissions of the data field.

In a specific embodiment, an AP can allocate via a trigger frame N RUs/MRUs for N transmissions of a data field by an STA. Further, the STA can perform N transmissions of the data field by using the N RUs/MRUs, and correspondingly, the AP can receive in the N RUs/MRUs the data field that is subject to duplication transmission by the STA.

In some embodiments, the trigger frame further contains seventh indication information indicating a duplication transmission mode for the STA, for example, indicating whether a duplication transmission mode is to be used (or enabled or activated) for the STA for data transmission.

In some embodiments, the seventh indication information is carried in a common information (common info) field or a UHR variant user information (UHR variant user info) field of the trigger frame.

When the seventh indication information is carried in the common info field, the seventh indication information is intended for all users triggered by the trigger frame. That is, when the seventh indication information indicates enabling the duplication transmission mode, it indicates that the duplication transmission mode is to be used for all the users, and when the seventh indication information indicates disabling the duplication transmission mode, it indicates that the duplication transmission mode is not to be used for all the users.

When the seventh indication information is carried in the UHR variant user info field, the seventh indication information is intended for a user indicated by the UHR variant user info field. That is, when the seventh indication information indicates enabling the duplication transmission mode, it indicates that the duplication transmission mode is to be used for the user indicated by the UHR variant user info field, and when the seventh indication information indicates disabling the duplication transmission mode, it indicates that the duplication transmission mode is not to be used for the user indicated by the UHR variant user info field.

In some embodiments, the trigger frame may contain a duplication transmission mode field. The duplication transmission mode field may be carried in a common information (common info) field or a UHR variant user information (UHR variant user info) field of the trigger frame.

For example, an existing field (a reserved field or a reserved bit) in the common info field or the UHR variant user info field is used as the duplication transmission mode field, or a field is newly added to the trigger frame as the duplication transmission mode field, which is not limited in the disclosure in this regard.

FIG. 14 is a schematic format diagram of a common info field carrying a duplication transmission mode field provided in embodiments of the disclosure. FIG. 15 is a schematic format diagram of a UHR variant user info field carrying a duplication transmission mode field provided in embodiments of the disclosure.

In some embodiments, the duplication transmission mode field may be of one bit, and different values of the one bit indicate whether a duplication transmission mode is to be enabled (or activated or used). For example, value "1" indicates enabling the duplication transmission mode, and value "0" indicates disabling the duplication transmission mode. For another example, value "0" indicates enabling the duplication transmission mode, and value "1" indicates disabling the duplication transmission mode.

It may be understood that, lengths and positions of the duplication transmission mode fields illustrated in FIG. 14 and FIG. 15 are merely examples, and the disclosure is not limited in this regard. The duplication transmission mode field may also be of other lengths, for example, 2 bits or more bits, and the duplication transmission mode field may also be located in a reserved field following a UHR reserved bit, etc.

In some embodiments, the trigger frame contains multiple UHR variant user info fields, and the multiple UHR variant user info fields indicate multiple RUs or multiple MRUs allocated by the AP for data transmission of the STA. Association identifier12 (AID12) fields in at least two of the multiple UHR variant user info fields indicate the same STA, and RU allocation fields in the at least two UHR variant user info fields indicate different RUs/MRUs. The different RUs/MRUs are located in different 20 MHz subchannels. As such, the STA can perform duplication transmission of the data field by using the different RUs/MRUs indicated by the RU allocation fields in the at least two UHR variant user info fields.

Correspondingly, after receiving the trigger frame, the STA can decode all the UHR variant user info fields, find multiple UHR variant user info fields that match an AID of the STA, and further find its own multiple RUs/MRUs based on RU/MRU information indicated by RU allocation fields in the multiple UHR variant user info fields. Further, the STA can perform duplication transmission in its own multiple RUs/MRUs. For example, the STA encodes data in the first RU/MRU and duplicates the data to the remaining RUs/MRUs.

With reference to FIG. 16, the specific implementation of allocation of RUs/MRUs for duplication transmission by an AP to multiple STAs will be described.

For example, during the 160 MHz OFDMA UHR TB PPDU duplication transmission, an AP indicates six UHR variant user info fields in a trigger frame. As illustrated in FIG. 16, AID12 in four UHR variant user info fields points to STA1, and RU allocation fields in the four UHR variant user info fields allocate four 242-tone RUs at different positions; and AID 12 in the remaining two UHR variant user info fields points to STA2, and RU allocation fields in the two UHR variant user info fields allocate two 484-tone RUs at different positions.

Correspondingly, an STA determines, based on indication of a duplication transmission mode field, whether a duplication transmission mode is to be used by the STA for data transmission. In the case where the duplication transmission mode field indicates that the duplication transmission mode is to be used, the STA can attempt to find multiple UHR variant user info fields that match an AID of the STA, and find its own multiple RUs/MRUs based on RU allocation information indicated by these UHR variant user info fields. Further, STA1 can encode data in one 242-tone RU and then duplicate the data to the second, third, and fourth 242-tone RUs, and STA2 can encode data in one 484-tone RU and then duplicate the data to the other one 484-tone RU, thereby realizing duplication transmission of the data.

As above mentioned, in embodiments of the disclosure, the transmitter can perform duplication transmission of a data field in a UHR PPDU at a granularity of a first frequency-domain resource unit (for example, a subchannel or an RU/MRU). As such, in case of interference on a certain subchannel, the receiver can still obtain complete data through other subchannels, thereby ensuring that the receiver can correctly decode the data, ensuring the reliability of data transmission, and reducing a transmission latency caused by data retransmission, and the change to an existing protocol is small.

In addition, in embodiments of the disclosure, a duplication transmission mode for the UHR PPDU can also be applied to a frequency band with a relatively high PSD limit to extended/enhance long range. For example, in a 6 GHz frequency band, an AP has a PSD limit of 5 dBm/MHz, and a non-AP STA has a PSD limit of −1 dBm/MHz; and in 5 GHz, the AP has a PSD limit of 17 dBm/MHz, and the non-AP STA has a PSD limit of 11 dBm/MHz. By comparison, transmit (TX) powers of the AP and non-AP STA operating in the 6 GHz frequency band decrease due to the PSD limit, which in turn reduces long range. In embodiments of the disclosure, without exceeding a limit on a total transmit power, the total transmit power can be increased by duplicating data in the frequency domain, thereby enhancing long range.

The method embodiments of the disclosure are described in detail above with reference to FIG. 3 to FIG. 16, and apparatus embodiments of the disclosure will be described in detail below with reference to FIG. 17 to FIG. 21. It may be understood that the apparatus embodiments and the method embodiments correspond to each other, and for similar illustrations, reference can be made to the method embodiments.

FIG. 17 is a schematic block diagram of a transmitter 400 according to embodiments of the disclosure. As illustrated in FIG. 17, the transmitter 400 includes a communication unit 410. The communication unit 410 is configured to transmit a first UHR ELR PPDU. The first UHR ELR PPDU contains a data field, the data field is transmitted N times at a granularity of a first frequency-domain resource unit in a bandwidth of the first UHR ELR PPDU, and N is a positive integer greater than 1.

In some embodiments, one or more of N−1 duplication transmissions of the data field have a phase rotation relative to the first transmission of the data field.

In some embodiments, the transmitter is an AP or an STA.

In some embodiments, the first frequency-domain resource unit is a subchannel.

In some embodiments, a bandwidth of the first frequency-domain resource unit is pre-defined or determined based on the bandwidth of the first UHR ELR PPDU.

In some embodiments, the first UHR ELR PPDU contains a UHR modulated field, the UHR modulated field includes the data field, a UHR-STF, and a UHR-LTF, and a granularity of each of the UHR-STF, the UHR-LTF, and a pilot subcarrier of the UHR modulated field is the first frequency-domain resource unit.

In some embodiments, the first UHR ELR PPDU contains a UHR modulated field, the UHR modulated field includes the data field, a UHR-STF, and a UHR-LTF, a granularity of each of the UHR-STF, the UHR-LTF, and a pilot subcarrier of the UHR modulated field is a second frequency-domain resource unit, and the first frequency-domain resource unit is different from the second frequency-domain resource unit.

In some embodiments, a bandwidth of the second frequency-domain resource unit is determined based on the bandwidth of the first UHR ELR PPDU.

In some embodiments, the bandwidth of the second frequency-domain resource unit is equal to the bandwidth of the first UHR ELR PPDU.

In some embodiments, the number N of duplication transmissions is pre-defined or determined based on the bandwidth of the UHR PPDU.

In some embodiments, the first UHR ELR PPDU contains first information, and the first information indicates duplication transmission configuration of the first UHR ELR PPDU.

In some embodiments, the first information includes at least one of: first indication information indicating a duplication transmission mode for the first UHR ELR PPDU; second indication information indicating the number N of duplication transmissions of the data field in the first UHR ELR PPDU; or third indication information indicating a bandwidth of the first frequency-domain resource unit.

In some embodiments, the first indication information is carried in a UHR-SIG field or a U-SIG field in the first UHR ELR PPDU.

In some embodiments, the second indication information is carried in a UHR-SIG field or a U-SIG field in the first UHR ELR PPDU.

In some embodiments, the third indication information is carried in a UHR-SIG field or a U-SIG field in the first UHR ELR PPDU.

In some embodiments, the first UHR ELR PPDU contains at least one of: a duplication transmission mode field indicating a duplication transmission mode for the first UHR ELR PPDU; a number of duplications field indicating the number N of duplication transmissions of the data field in the first UHR ELR PPDU; or a granularity of duplication field indicating a bandwidth of a frequency-domain resource unit for duplication transmission of the data field in the first UHR ELR PPDU.

In some embodiments, the duplication transmission mode field is carried in a UHR-SIG field or a U-SIG field.

In some embodiments, the number of duplications field is carried in a UHR-SIG field or a U-SIG field.

In some embodiments, the granularity of duplication field is carried in a UHR-SIG field or a U-SIG field.

In some embodiments, the first frequency-domain resource unit is an RU or an MRU.

In some embodiments, N first frequency-domain resource units for N transmissions of the data field are located in different 20 MHz subchannels.

In some embodiments, RUs or MRUs for N transmissions of the data field are allocated by the transmitter.

In some embodiments, the first UHR ELR PPDU contains second information. The second information includes at least one of: fourth indication information indicating a duplication transmission mode for the first UHR ELR PPDU; fifth indication information indicating the RUs or MRUs for N transmissions of the data field; or sixth indication information indicating a receiver of the data field.

In some embodiments, the fourth indication information is carried in a U-SIG field or a UHR-SIG field in the first UHR ELR PPDU.

In some embodiments, the fourth indication information is carried in a common field or a user field in the UHR-SIG field.

In some embodiments, the fifth indication information is carried in a common field of a UHR-SIG field in the first UHR ELR PPDU, and the sixth indication information is carried in a user field of the UHR-SIG field in the first UHR ELR PPDU.

In some embodiments, the common field of the UHR-SIG field in the first UHR ELR PPDU indicates multiple RUs or multiple MRUs, the UHR-SIG field includes multiple user fields, the multiple user fields are in one-to-one correspondence with the multiple RUs or the multiple MRUs, and data for a receiver indicated by the multiple user fields is transmitted using corresponding RUs or MRUs.

In some embodiments, at least two user fields among the multiple user fields indicate the same receiver.

In some embodiments, RUs or MRUs for N transmissions of the data field are allocated by a receiver of the first UHR ELR PPDU.

In some embodiments, the transmitter is an STA, the receiver is an AP, and the RUs or MRUs for N transmissions of the data field are allocated by the AP.

In some embodiments, the RUs or MRUs for N transmissions of the data field are allocated by the AP via a trigger frame.

In some embodiments, the trigger frame contains multiple UHR variant user information fields, and the multiple UHR variant user information fields indicate multiple RUs or multiple MRUs allocated for data transmission of the STA.

In some embodiments, all association identifier12 (AID12) fields in the multiple UHR variant user information fields indicate identity information of the STA.

In some embodiments, the trigger frame further contains seventh indication information indicating a duplication transmission mode for the STA.

In some embodiments, the seventh indication information is carried in a common information field or a UHR variant user information field of the trigger frame.

Optionally, in some embodiments, the communication unit above may be a communication interface or a transceiver, or may be an input/output interface of a communication chip or an SOC.

It may be understood that, the transmitter 400 according to embodiments of the disclosure may correspond to the transmitter in the method embodiments of the disclosure, and the foregoing and other operations and/or functions of various units in the transmitter 400 are respectively intended for implementing corresponding procedures of the transmitter in the method 200 illustrated in FIG. 3 to FIG. 16, which will not be repeated herein for the sake of brevity.

FIG. 18 is a schematic block diagram of a receiver according to embodiments of the disclosure. The receiver 500 in FIG. 18 includes a communication unit 510. The communication unit 510 is configured to receive a first UHR ELR PPDU transmitted by a transmitter. The first UHR ELR PPDU contains a data field, the data field is transmitted N times at a granularity of a first frequency-domain resource unit in a bandwidth of the first UHR ELR PPDU, and N is a positive integer greater than 1.

In some embodiments, one or more of N−1 duplication transmissions of the data field have a phase rotation relative to the first transmission of the data field.

In some embodiments, the receiver is an AP or an STA, and the transmitter is the STA or the AP.

In some embodiments, the first frequency-domain resource unit is a subchannel.

In some embodiments, a bandwidth of the first frequency-domain resource unit is pre-defined or determined based on the bandwidth of the first UHR ELR PPDU.

In some embodiments, the first UHR ELR PPDU contains a UHR modulated field, the UHR modulated field includes the data field, a UHR-STF, and a UHR-LTF, and a granularity of each of the UHR-STF, the UHR-LTF, and a pilot subcarrier of the UHR modulated field is the first frequency-domain resource unit.

In some embodiments, the first UHR ELR PPDU contains a UHR modulated field, the UHR modulated field includes the data field, a UHR-STF, and a UHR-LTF, a granularity of each of the UHR-STF, the UHR-LTF, and a pilot subcarrier of the UHR modulated field is a second frequency-domain resource unit, and the first frequency-domain resource unit is different from the second frequency-domain resource unit.

In some embodiments, a bandwidth of the second frequency-domain resource unit is determined based on the bandwidth of the first UHR ELR PPDU.

In some embodiments, the bandwidth of the second frequency-domain resource unit is equal to the bandwidth of the first UHR ELR PPDU.

In some embodiments, the number N of duplication transmissions is pre-defined or determined based on the bandwidth of the UHR PPDU.

In some embodiments, the first UHR ELR PPDU contains first information, and the first information indicates duplication transmission configuration of the first UHR ELR PPDU.

In some embodiments, the first information includes at least one of: first indication information indicating a duplication transmission mode for the first UHR ELR PPDU; second indication information indicating the number N of duplication transmissions of the data field in the first UHR ELR PPDU; or third indication information indicating a bandwidth of the first frequency-domain resource unit.

In some embodiments, the first indication information is carried in a UHR-SIG field or a U-SIG field in the first UHR ELR PPDU.

In some embodiments, the second indication information is carried in a UHR-SIG field or a U-SIG field in the first UHR ELR PPDU.

In some embodiments, the third indication information is carried in a UHR-SIG field or a U-SIG field in the first UHR ELR PPDU.

In some embodiments, the first UHR ELR PPDU contains at least one of: a duplication transmission mode field indicating a duplication transmission mode for the first UHR ELR PPDU; a number of duplications field indicating the number N of duplication transmissions of the data field in the first UHR ELR PPDU; or a granularity of duplication field indicating a bandwidth of a frequency-domain resource unit for duplication transmission of the data field in the first UHR ELR PPDU.

In some embodiments, the duplication transmission mode field is carried in a UHR-SIG field or a U-SIG field.

In some embodiments, the number of duplications field is carried in a UHR-SIG field or a U-SIG field.

In some embodiments, the granularity of duplication field is carried in a UHR-SIG field or a U-SIG field.

In some embodiments, the first frequency-domain resource unit is an RU or an MRU.

In some embodiments, N first frequency-domain resource units for N transmissions of the data field are located in different 20 MHz subchannels.

In some embodiments, RUs or MRUs for N transmissions of the data field are allocated by the transmitter.

In some embodiments, the first UHR ELR PPDU contains second information. The second information includes at least one of: fourth indication information indicating a duplication transmission mode for the first UHR ELR PPDU; fifth indication information indicating the RUs or MRUs for N transmissions of the data field; or sixth indication information indicating a receiver of the data field.

In some embodiments, the fourth indication information is carried in a U-SIG field or a UHR-SIG field in the first UHR ELR PPDU.

In some embodiments, the fourth indication information is carried in a common field or a user field in the UHR-SIG field.

In some embodiments, the fifth indication information is carried in a common field of a UHR-SIG field in the first UHR ELR PPDU, and the sixth indication information is carried in a user field of the UHR-SIG field in the first UHR ELR PPDU.

In some embodiments, the common field of the UHR-SIG field in the first UHR ELR PPDU indicates multiple RUs or multiple MRUs, the UHR-SIG field includes multiple user fields, the multiple user fields are in one-to-one correspondence with the multiple RUs or the multiple MRUs, and data for a receiver indicated by the multiple user fields is transmitted using corresponding RUs or MRUs.

In some embodiments, at least two user fields among the multiple user fields indicate the same receiver.

In some embodiments, RUs or MRUs for N transmissions of the data field are allocated by the receiver of the first UHR ELR PPDU.

In some embodiments, the transmitter is an STA, the receiver is an AP, and the RUs or MRUs for N transmissions of the data field are allocated by the AP.

In some embodiments, the RUs or MRUs for N transmissions of the data field are allocated by the AP via a trigger frame.

In some embodiments, the trigger frame contains multiple UHR variant user information fields, and the multiple UHR variant user information fields indicate multiple RUs or multiple MRUs allocated for data transmission of the STA.

In some embodiments, all association identifier12 (AID12) fields in the multiple UHR variant user information fields indicate identity information of the STA.

In some embodiments, the trigger frame further contains seventh indication information indicating a duplication transmission mode for the STA.

In some embodiments, the seventh indication information is carried in a common information field or a UHR variant user information field of the trigger frame.

Optionally, in some embodiments, the communication unit above may be a communication interface or a transceiver, or may be an input/output interface of a communication chip or an SOC.

It may be understood that, the receiver 500 according to embodiments of the disclosure may correspond to the receiver in the method embodiments of the disclosure, and the foregoing and other operations and/or functions of various units in the receiver 500 are respectively intended for implementing corresponding procedures of the receiver in the method 200 illustrated in FIG. 3 to FIG. 16, which will not be repeated herein for the sake of brevity.

Figure 19:
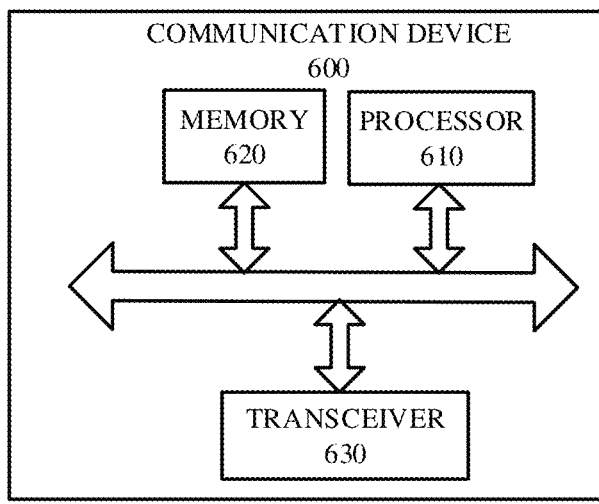
FIG. 19 is a schematic block diagram of a communication device provided in embodiments of the disclosure.

FIG. 19 is a schematic structural diagram of a communication device 600 provided in embodiments of the disclosure. The communication device 600 illustrated in FIG. 19 includes a processor 610. The processor 610 can invoke and execute a computer program stored in a memory, so as to implement the method in embodiments of the disclosure.

Optionally, as illustrated in FIG. 19, the communication device 600 may further include a memory 620. The processor 610 can invoke and execute a computer program stored in the memory 620, so as to implement the method in embodiments of the disclosure.

The memory 620 may be a separate device independent of the processor 610, or may be integrated into the processor 610.

Optionally, as illustrated in FIG. 19, the communication device 600 may further include a transceiver 630. The processor 610 can control the transceiver 630 to communicate with other devices, specifically, to transmit information or data to other devices or to receive information or data from other devices.

The transceiver 630 may include a transmitter and a receiver. The transceiver 630 may further include an antenna, where one or more antennas may be provided.

Optionally, the communication device 600 may specifically be the network device in embodiments of the disclosure, and the communication device 600 may implement corresponding operations implemented by the network device in various methods in embodiments of the disclosure, which will not be repeated herein for the sake of brevity.

Optionally, the communication device 600 may specifically be the mobile terminal/terminal device in embodiments of the disclosure, and the communication device 600 may implement corresponding operations implemented by the mobile terminal/terminal device in various methods in embodiments of the disclosure, which will not be repeated herein for the sake of brevity.

Figure 20:
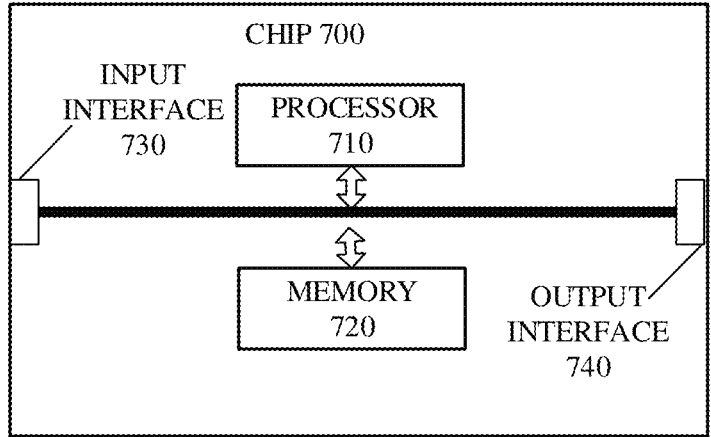
FIG. 20 is a schematic block diagram of a chip provided in embodiments of the disclosure.

FIG. 20 is a schematic structural diagram of a chip according to embodiments of the disclosure. The chip 700 illustrated in FIG. 20 includes a processor 710. The processor 710 can invoke and execute a computer program stored in a memory, so as to implement the method in embodiments of the disclosure.

Optionally, as illustrated in FIG. 20, the chip 700 may further include a memory 720. The processor 710 can invoke and execute a computer program stored in the memory 720, so as to implement the method in embodiments of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, and specifically, to obtain information or data transmitted by other devices or chips.

Optionally, the chip 700 may further include an output interface 740. The processor 710 can control the output interface 740 to communicate with other devices or chips, and specifically, to output information or data to other devices or chips.

Optionally, the chip may be applied to the transmitter in embodiments of the disclosure, and the chip may implement corresponding operations implemented by the transmitter in various methods in embodiments of the disclosure, which will not be repeated herein for the sake of brevity.

Optionally, the chip may be applied to the receiver in embodiments of the disclosure, and the chip may implement corresponding operations implemented by the receiver in various methods in embodiments of the disclosure, which will not be repeated herein for the sake of brevity.

It may be understood that, the chip mentioned in embodiments of the disclosure may also be referred to as an SoC, etc.

Figure 21:
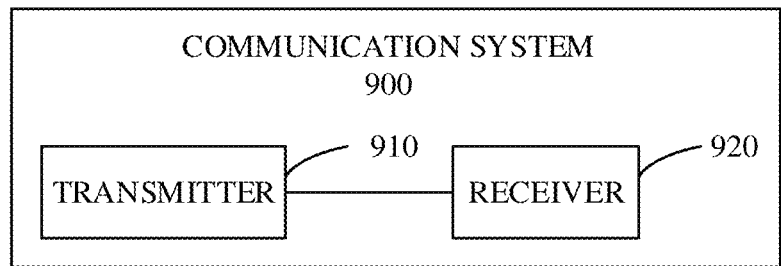
FIG. 21 is a schematic block diagram of a communication system provided in embodiments of the disclosure.

FIG. 21 is a schematic block diagram of a communication system 900 provided in embodiments of the disclosure. As illustrated in FIG. 21, the communication system 900 includes a transmitter 910 and a receiver 920.

The transmitter 910 may be configured to implement corresponding functions implemented by the transmitter in the foregoing methods, and the receiver 920 may be configured to implement corresponding functions implemented by the receiver in the foregoing methods, which will not be repeated herein for the sake of brevity.

It may be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an ASIC, a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium mature in the skill such as a random access memory (RAM), a flash memory, a read-only memory (ROM), a programmable ROM (PROM), or an electrically erasable programmable memory, registers, and the like. The storage medium is located in the memory. The processor reads the information in the memory, and completes the steps of the method described above with the hardware of the processor.

It may be understood that, the memory in embodiments of the disclosure may be a volatile memory or a non-volatile memory, or may include both the volatile memory and the non-volatile memory. The non-volatile memory may be an ROM, a PROM, an erasable PROM (EPROM), an electrically EPROM (EEPROM), or a flash memory. The volatile memory may be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It may be noted that, the memory of the systems and methods described in the disclosure is intended to include, but is not limited to, these and any other suitable types of memory.

It may be understood that, the memory above is intended for illustration rather than limitation. For example, the memory in embodiments of the disclosure may also be an SRAM, a DRAM, an SDRAM, a DDR SDRAM, an ESDRAM, an SLDRAM, a DR RAM, etc. In other words, the memory in embodiments of the disclosure is intended to include, but is not limited to, these and any other suitable types of memory.

A computer-readable storage medium is further provided in embodiments of the disclosure. The computer-readable storage medium is configured to store a computer program.

Optionally, the computer-readable storage medium may be applied to the transmitter in embodiments of the disclosure, and the computer program causes a computer to execute corresponding operations implemented by the transmitter in various methods in embodiments of the disclosure, which will not be repeated herein for the sake of brevity.

Optionally, the computer-readable storage medium may be applied to the receiver in embodiments of the disclosure, and the computer program causes a computer to execute corresponding operations implemented by the receiver in various methods in embodiments of the disclosure, which will not be repeated herein for the sake of brevity.

A computer program product is further provided in embodiments of the disclosure. The computer program product includes computer program instructions.

Optionally, the computer program product may be applied to the transmitter in embodiments of the disclosure, and the computer program instructions cause a computer to execute corresponding operations implemented by the transmitter in various methods in embodiments of the disclosure, which will not be repeated herein for the sake of brevity.

Optionally, the computer program product may be applied to the receiver in embodiments of the disclosure, and the computer program instructions cause a computer to execute corresponding operations implemented by the receiver in various methods in embodiments of the disclosure, which will not be repeated herein for the sake of brevity.

A computer program is further provided in embodiments of the disclosure.

Optionally, the computer program may be applied to the transmitter in embodiments of the disclosure. The computer program, when executed by a computer, causes the computer to implement corresponding operations implemented by the transmitter in various methods in embodiments of the disclosure, which will not be repeated herein for the sake of brevity.

Optionally, the computer program may be applied to the receiver in embodiments of the disclosure. The computer program, when executed by a computer, causes the computer to implement corresponding operations implemented by the receiver in various methods in embodiments of the disclosure, which will not be repeated herein for the sake of brevity.

It will be appreciated by those of ordinary skill in the art that units and algorithmic operations of various examples described in connection with embodiments of the disclosure can be implemented by electronic hardware or by a combination of computer software and electronic hardware. Whether these functions are performed by means of hardware or software depends on particular application and the design constraints of the technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, an ROM, an RAM, a magnetic disk, or an optical disk.

The foregoing elaborations are merely embodiments of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A method for wireless communication, comprising: transmitting, by a transmitter, a first ultra-high reliability (UHR) enhanced long range (ELR) physical layer protocol data unit (PPDU), wherein the first UHR ELR PPDU at least comprises a legacy short training field (L-STF), a legacy long training field (L-LTF), a legacy signal (L-SIG) field, a repeated L-SIG (RL-SIG) field, a universal signal (U-SIG) field, a UHR-STF, a UHR-LTF, a data field, and a packet extension (PE) field, wherein the data field is transmitted at a granularity of a first frequency-domain resource unit with N times duplication in a bandwidth of the first UHR ELR PPDU, and N equals to 4;

wherein a duration of the L-STF is 8 μs, a duration of the L-LTF is 8 μs, a duration of the L-SIG field is 4 μs, a duration of the RL-SIG field is 4 μs, a duration of the U-SIG field is 8 μs, and a duration of the UHR-STF is 4 μs; and wherein each of one or more of N−1 duplication transmissions of the data field has a phase rotation relative to a first transmission of the data field.

2. The method of claim 1, wherein the transmitter is an access point (AP) or a station (STA).

3. The method of claim 1, wherein the U-SIG field comprises a first part U-SIG-1 and a second part U-SIG-2.

4. The method of claim 1, wherein the U-SIG field comprises a physical (PHY) version identifier field, a bandwidth (BW) field, an uplink/downlink (UL/DL) field, a basic service set (BSS) color field, a transmission opportunity (TXOP) field, a duplication transmission mode field, a number of duplications field, a disregard field, a validate field, a PPDU type and compression mode field, a punctured channel information field, a UHR-SIG modulation and coding scheme (MCS) field, a number of UHR-SIG symbols field, a cyclical redundancy check (CRC) field, and a tail field.

5. The method of claim 1, wherein the U-SIG field at least comprises a PHY version identifier field, a BW field, a UL/DL field, a BSS color field, a TXOP field, a disregard field, a validate field, a PPDU type and compression mode field, a CRC field, and a tail field.

6. A transmitter, comprising:
a transceiver;
a processor coupled to the transceiver; and
a memory storing a computer program which, when executed by the processor, causes the transmitter to:
transmit a first ultra-high reliability (UHR) enhanced long range (ELR) physical layer protocol data unit (PPDU), wherein the first UHR ELR PPDU at least comprises a legacy short training field (L-STF), a legacy long training field (L-LTF), a legacy signal (L-SIG) field, a repeated L-SIG (RL-SIG) field, a universal signal (U-SIG) field, a UHR-STF, a UHR-LTF, a data field, and a packet extension (PE) field, wherein the data field is transmitted at a granularity of a first frequency-domain resource unit with N times duplication in a bandwidth of the first UHR ELR PPDU, and N equals to 4;
wherein a duration of the L-STF is 8 μs, a duration of the L-LTF is 8 μs, a duration of the L-SIG field is 4 μs, a duration of the RL-SIG field is 4 μs, a duration of the U-SIG field is 8 μs, and a duration of the UHR-STF is 4 μs; and
wherein each of one or more of N−1 duplication transmissions of the data field has a phase rotation relative to a first transmission of the data field.

7. The transmitter of claim 6, wherein the transmitter is an access point (AP) or a station (STA).

8. The transmitter of claim 6, wherein the U-SIG field comprises a first part U-SIG-1 and a second part U-SIG-2.

9. The transmitter of claim 6, wherein the U-SIG field comprises a physical (PHY) version identifier field, a bandwidth (BW) field, an uplink/downlink (UL/DL) field, a basic service set (BSS) color field, a transmission opportunity (TXOP) field, a duplication transmission mode field, a number of duplications field, a disregard field, a validate field, a PPDU type and compression mode field, a punctured channel information field, a UHR-SIG modulation and coding scheme (MCS) field, a number of UHR-SIG symbols field, a cyclical redundancy check (CRC) field, and a tail field.

10. The transmitter of claim 6, wherein the U-SIG field at least comprises a PHY version identifier field, a BW field, a UL/DL field, a BSS color field, a TXOP field, a disregard field, a validate field, a PPDU type and compression mode field, a CRC field, and a tail field.

11. A receiver, comprising:
a transceiver;
a processor coupled to the transceiver; and
a memory storing a computer program which, when executed by the processor, causes the receiver to:
receive a first ultra-high reliability (UHR) enhanced long range (ELR) physical layer protocol data unit (PPDU), wherein the first UHR ELR PPDU at least comprises a legacy short training field (L-STF), a legacy long training field (L-LTF), a legacy signal (L-SIG) field, a repeated L-SIG (RL-SIG) field, a universal signal (U-SIG) field, a UHR-STF, a UHR-LTF, a data field, and a packet extension (PE) field, wherein the data field is transmitted at a granularity of a first frequency-domain resource unit with N times duplication in a bandwidth of the first UHR ELR PPDU, and N equals to 4;
wherein a duration of the L-STF is 8 μs, a duration of the L-LTF is 8 μs, a duration of the L-SIG field is 4 μs, a duration of the RL-SIG field is 4 μs, a duration of the U-SIG field is 8 μs, and a duration of the UHR-STF is 4 μs; and
wherein each of one or more of N−1 duplication transmissions of the data field has a phase rotation relative to a first transmission of the data field.

12. The receiver of claim 11, wherein the U-SIG field comprises a first part U-SIG-1 and a second part U-SIG-2.

13. The receiver of claim 11, wherein the U-SIG field comprises a physical (PHY) version identifier field, a bandwidth (BW) field, an uplink/downlink (UL/DL) field, a basic service set (BSS) color field, a transmission opportunity (TXOP) field, a duplication transmission mode field, a number of duplications field, a disregard field, a validate field, a PPDU type and compression mode field, a punctured channel information field, a UHR-SIG modulation and coding scheme (MCS) field, a number of UHR-SIG symbols field, a cyclical redundancy check (CRC) field, and a tail field.

14. The receiver of claim 11, wherein the U-SIG field at least comprises a PHY version identifier field, a BW field, a UL/DL field, a BSS color field, a TXOP field, a disregard field, a validate field, a PPDU type and compression mode field, a CRC field, and a tail field.

* * * * *